United States Patent
Soliman

(10) Patent No.: US 7,233,664 B2
(45) Date of Patent: Jun. 19, 2007

(54) DYNAMIC SECURITY AUTHENTICATION FOR WIRELESS COMMUNICATION NETWORKS

(75) Inventor: Hamdy Soliman, Socorro, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 766 days.

(21) Appl. No.: 10/448,989

(22) Filed: May 30, 2003

(65) Prior Publication Data

US 2004/0179690 A1   Sep. 16, 2004

Related U.S. Application Data

(63) Continuation-in-part of application No. 10/387,711, filed on Mar. 13, 2003.

(51) Int. Cl.
*H04L 9/00* (2006.01)
*H04K 1/00* (2006.01)

(52) U.S. Cl. .................. 380/44; 380/270; 713/168

(58) Field of Classification Search ............ 380/270, 380/274, 277, 44; 713/168–170; 726/2–3
See application file for complete search history.

(56) References Cited

U.S. PATENT DOCUMENTS

| | | | |
|---|---|---|---|
| 6,701,435 B1 * | 3/2004 | Numao et al. | 713/168 |
| 6,853,988 B1 * | 2/2005 | Dickinson et al. | 705/75 |
| 7,046,992 B2 * | 5/2006 | Wallentin et al. | 455/411 |

* cited by examiner

*Primary Examiner*—Hosuk Song
(74) *Attorney, Agent, or Firm*—Robert W Becker & Associates; Robert W Becker

(57) ABSTRACT

In a first embodiment, a dynamic computer system security method and system using dynamic encryption and full synchronization between system nodes. A data record created by a source user is encrypted with an initial dynamic session key. A new dynamic session key is generated based upon a data record and a previous dynamic session key. A central authority is used to synchronize and authenticate both source and destination users with constantly regenerated dynamic authentication keys. In a second embodiment, a method of providing dynamic security authentication between wireless communication network nodes. An initial authentication key and an address are assigned to certain of the nodes. The address along with information encrypted by the initial authentication key is sent to an authentication server. The authentication server and node or nodes synchronously regenerate authentication keys based upon the initial authentication key. Secure handovers occur between nodes via an authentication key.

26 Claims, 21 Drawing Sheets

DYNAMIC SECURITY AUTHENTICATION FOR WIRELESS COMMUNICATION NETWORKS

CROSS-REFERENCE TO RELATED APPLICATIONS

This application is a continuation-in-part of U.S. patent application Ser. No. 10/387,711, entitled "Computer System Security via Dynamic Encryption," filed on Mar. 13, 2003, and claims the benefit of the filing date thereof. The entire specification of the parent application is incorporated herein by reference.

BACKGROUND OF THE INVENTION

1. Field of the Invention (Technical Field)

The present invention relates to the field of wireless communication network security, more particularly to a dynamic authentication method and system for providing secure authentication amongst wireless communication network nodes.

2. Background Art

The fundamental objective of cryptography is to enable users to communicate securely via an insecure shared data communication channel or system environment, maintaining data integrity, privacy, and user authentication. Over the past century, various cryptography systems have been developed which require a great deal of time to break even with large computational power. However, if an intruder obtains the encryption key, the encryption mechanism, and probably the entire system security, is compromised and a new key is required.

In order to make an encryption system nearly impenetrable to an intruder, two strategies are commonly used: 1) a long encryption key, and/or 2) a complex encryption function. A key of length n bits has a $2^n$ search space. Therefore, for large values of n an intruder needs to spend more than a lifetime to break the cipher. Also, simpler encryption functions provide a less secure encryption system. For instance, an encryption code that applies the logic XOR function is easy to decipher no matter how long the key length is. This is because the XOR operation is performed on one bit of data and its corresponding bit from the encryption key, one bit at a time. The deciphering approach of such simple encryption functions by an intruder is based on the divide-and-conquer mechanism. The intruder first deciphers individual key fragments, which is relatively uncomplicated to accomplish due to the simple linearity of the XOR function, then reconstructs the entire key once all of the individual fragments are obtained. It is more difficult to apply such a divide-and-conquer approach to break the key of a nonlinear exponential encryption function, such as used in the Rivest-Shamir-Adelman (RSA) system.

At present, there are two major cryptography system philosophies: 1) symmetric systems (static or semi-dynamic key), and 2) public key systems (static key). In symmetric systems, e.g., DES, AES, etc., a key is exchanged between the users, the sender and receiver, and is used to encrypt and decrypt the data. There are three major problems with symmetric systems. First, exchanging the key between users introduces a security loophole. In order to alleviate such a problem, the exchanged key is encrypted via a secure public key cryptography system. Second, the use of only one static encryption key makes it easier for an intruder to have an ample amount of time to break the key. This issue is addressed by the use of multiple session keys that are exchanged periodically. Third, and more importantly is the susceptibility to an "insider" attack on the key. This is referred to as the "super user" spying on the "setting duck" static key inside the system, where the time window between exchanging keys might be long enough for a super user, who has a super user privilege, to break in and steal the key.

In the RSA public key cryptography system, a user (U) generates two related keys, one is revealed to the public, deemed the "public" key, to be used to encrypt any data to be sent to U. The second key is private to U, called the "private" key, and is used to decrypt any data received at U, which was encrypted with the corresponding public key. The RSA cryptography system generates large random primes and multiplies them to get the public key. It also uses a complex encryption function such as mod and exponential operations. As a result, this technique is unbreakable in the lifetime of a human being for large keys, e.g., higher than 256 bits, and also eliminates the problem of the insecure exchange of symmetric keys, as in a DES system. However, the huge computational time required by RSA encryption and decryption, in addition to the time required to generate the keys, is not appealing to the Internet user community. Thus, RSA cryptography is mainly used as "one shot" solid protection of the symmetric cryptography key exchange.

In the RSA public key system, if a first user ($U_A$) requests a secure communication with a second user ($U_B$), the latter will generate a pair of encryption keys: public $E_B$ and private $D_B$. An internal super user spy (S), with a helper (H) intruding on the communication line externally, can easily generate its own pair of keys, a public $E_S$ and private $D_S$, and pass $D_S$ and $E_B$ to H. Then S can replace the public key $E_B$ with its own public key $E_S$. Thus, all data moving from $U_A$ to $U_B$ will be encrypted using $E_S$ instead of $E_B$. Now H can decrypt the cipher text moving between $U_A$ and $U_B$ using the private key $D_S$, store it, and re-encrypt it using the original $E_B$, in order for $U_B$ to receive and decrypt it without any knowledge of the break that occurred in the middle. Such an attack is typically called the "super-user-in-the-middle" attack.

Even though they are secure against outsider attack, both the symmetric and public key cryptography systems are still vulnerable to insider attacks. By obtaining the key at any time of a secure session, an intruder can decipher the entire exchanged data set, past and future. Further, a super user can easily steal a static symmetric key and send it to an outside intruder to sniff and decrypt the cipher text, particularly in the DES and AES systems.

A common way to protect a static encryption key is to save it under a file with restricted access. This restriction is not enough, however, to prevent a person with super-user privilege from accessing the static key in the host file. Even when keys are changed for each communication session, for example in the Diffie-Hufman system, there is a time window enough for the super-user to obtain the semi-static key. In most crypto systems, once the key is found the previous and future communicated data are no longer secure.

Various other attempts have been made to circumvent intrusion by outside users through encryption of communicated data. Examples of such methods include that described in U.S. Pat. No. 6,105,133 to Fielder, et al., entitled, "Bilateral Authentication and Encryption System;" U.S. Pat. No. 6,049,612 also to Fielder, et al., entitled, "File Encryption Method and System;" and U.S. Pat. No. 6,070,198 to Krause, et al., entitled, "Encryption with a Streams-Based Protocol Stack." While the techniques described in these patents may be useful in preventing unwanted intrusion by outsiders, they are still prone to attack by the super-user-in-the-middle.

Wireless communication networks are also prone to security breaches. The ability to provide mobile communications and broadband media services are two major requirements of modern telecommunication networks. The requirement to allow mobile communication devices, or "supplicants", to move between access points (APs), or base stations, while maintaining full, mutually-secure authentication makes mobility management one of the critical aspects of wireless communication. The rapid progress in wireless communication systems, personal communication systems, and "smartcard" technologies has brought new opportunities and challenges to be met by engineers and researchers working on the security issues related to new communication technologies.

Public-key cryptography offers robust solutions to many of the existing security problems in communication systems, however, excessive computational demands caused by on-line memory, code size, speed, etc. have made the use of public key cryptography limited, particularly on wireless communication systems. The implementation of public-key cryptography on server and client main platforms rarely causes problems due to the availability of high-speed processors and extensive memory space. However, in restricted hardware environments with limited computational power and small memory, such as in smartcards and mobile telephones, maintaining a secure environment is more challenging. Thus, the integration of public-key cryptographic techniques is often delayed or completely ruled out due to the difficulty of obtaining efficient, reliable solutions.

An industry standard describes the communication that occurs in wireless local area networks (LANs). The Wired Equivalent Privacy (WEP) algorithm is used to protect wireless communication from eavesdropping. WEP relies on a secret encryption key that is shared between a supplicant such as a laptop personal computer with a wireless card, and an AP. The secret key is used to encrypt data packets before they are transmitted, and an integrity check is used to ensure that packets are not modified in transit. The standard does not discuss how the shared key is established. In practice, most installations use a single key that is shared between all mobile stations and access points.

WEP uses the RC4 stream cipher encryption algorithm. A stream cipher operates by expanding a short key into an infinite pseudo-random key stream. The sender XORs the key stream with the plaintext to produce ciphertext. The receiver has a copy of the same key, and uses it to generate an identical key stream. By XORing the key stream with the ciphertext, the receiver yields the original plaintext. To ensure that a data packet has not been modified in transit, an Integrity Check (IC) field is included in the packet. To avoid encrypting two ciphertexts with the same key stream, an Initialization Vector (IV) is used to augment the shared secret key and produce a different RC4 key for each packet. The IV is also included in the packet. However, both of these measures are implemented incorrectly, resulting in poor security.

Ineffective WEP security leads to different types of intrusion, or attacks, by outsiders. For example, a passive eavesdropper can intercept all wireless traffic, until an IV collision occurs. By XORing two packets that use the same IV, the attacker obtains the XOR of the two plaintext messages. The resulting XOR can be used to make inferences regarding the contents of the two messages. The Internet Protocol traffic is often very predictable and includes a great deal of redundancy. This redundancy can be used to eliminate many possibilities for the contents of messages. Further educated guesses about the contents of one or both of the messages can be used to statistically narrow the field of possible messages, and in some cases it is possible to determine the exact contents of the message.

Another type of attack is also possible when using the WEP algorithm to secure communications. If an attacker knows the exact plaintext for one encrypted message, the attacker can use this knowledge to construct correct encrypted packets. The procedure involves constructing a new message, calculating the Cyclic Redundancy Check (CRC-32), and performing bit flips on the original encrypted message to change the plaintext to the new message. The basic property is: RC4(X) XOR X XOR Y=RC4(Y). This packet can then be sent to the access point or supplicant where it will be accepted as a valid packet.

Even though the WEP algorithm is part of the standard that describes communication in wireless LANs, the WEP algorithm has failed to protect wireless communication from eavesdropping and unauthorized access to wireless networks. This is primarily due to the fact that it relies on a static secret key shared between a supplicant and the wireless network.

In a first embodiment, the present invention alleviates the problems encountered in prior art communication network security, providing continuous encryption key modification, one key for each data record. New keys are generated from the previous key and data record, and are used to encrypt the subsequent data record. The key lifetime is equal to the time span of record encryption, which is too small for an intruder to break and a super-user to copy. The present invention also reduces computational overhead by breaking the complexity of the encryption function and shifting it over the dynamics of data exchange. Speed is also improved through the use of a simple XOR logic encryption function. A shuffling mechanism based on a dynamic permutation table, which is generated from the current session key, is coupled with the XOR logic operation, to strengthen the encryption function. The present invention also alleviates the "super-user-in-the-middle" attack. An intruder must obtain an entire set of keys, at the right moment, without being noticed, in order to decrypt the entire ciphered message. Encryption is fully automated and all parties, the source user, destination user, and central authority, are clock-free synchronized, and securely authenticated, at all times. The dynamic key encryption system of the present invention is deployable at any level of a system, as there is complete synchronization between parties.

In a second embodiment, the present invention utilizes the continuous authentication mechanism of the first embodiment to implement secure and dynamic authentication between wireless communication network nodes.

SUMMARY OF THE INVENTION
(DISCLOSURE OF THE INVENTION)

In a first embodiment, the present invention is a method of providing a secure data stream between system nodes. The method includes creating data at a source user node and regenerating a new encryption key, or dynamic session key (DSK), at the node using the created data and a previous DSK. The new DSK is generated by performing a logic operation on a previous DSK and a data record. Preferably, the logic operation is an XOR operation. The data record and previous DSK are XORed to form an expanded key, ExpK.

Bytes are randomly selected from the ExpK to generate the new DSK, using a byte from a previous DSK as a seed of random generation.

A data record is encrypted with a DSK by performing a logic XOR operation on the data and DSK to form a temporary cipher. Portions of the cipher are then permuted to form another cipher, which is then transmitted over a data stream to the destination user node.

A block of n data records at a time, each record of m bytes, and a corresponding number of n DSKs, each of m bytes, are combined to form n new DSKs. The n new DSKs are then used to encrypt the subsequent block of n data records. The process continues until all data records are encrypted and transmitted from the source user node.

The method further comprises the step of receiving encrypted data at a destination user node and decrypting the received encrypted data with a DSK. Once the encrypted data is decrypted, new DSKs are regenerated at the destination user node using the decrypted data and a previous DSK. A central authority node is used to assure that both the source and destination nodes begin with the same initial DSK so that the destination node can properly decrypt the received encrypted data.

The present invention is further a method of authenticating one system node to another system node comprising the steps of: generating an authentication key at a central authority node; transmitting the authentication key to a user node; and starting a daemon at the central authority node and a daemon at the user node. These daemons regenerate new dynamic authentication keys (DAKs) every δt and maintain a corresponding number-regeneration-counter at each node.

A new DAK is generated by performing an XOR logic operation on a previous DAK and an auxiliary key, K. Performing the XOR operation on the previous DAK and auxiliary key, K forms an expanded key, ExpK. Bytes are randomly selected from this expanded key to generate the new DAK, where a byte from a previous DAK is used as a seed of random generation. The auxiliary key, K, is formed by performing an XOR logic operation on the DAK and last used DSK. Performing the XOR operation on the previous DAK and DSK forms an expanded key, ExpK. Bytes are randomly selected from this expanded key to generate the auxiliary static key, K, where a byte from the DAK is used as a seed of random generation. If no previous DSK exists, because it is the user's initial session, then K is formed from the initial DAK, only, where a copy of the DAK replaces the nonexistent DSK.

The method of the present invention also includes synchronizing one node to another node. Synchronization is achieved by aligning the DAKs of one node to another and comprises the steps of: forking a child communication process at a user node which freezes the DAK and its number regeneration count at the user node; transmitting the frozen DAK number regeneration count from the user node to a central authority node; forking a child communication process at the central authority node which snapshots the DAK number regeneration count for that user at the central authority node; comparing the frozen and snapshot DAK number regeneration counts of the user and central authority nodes; and aligning the DAKs of the user and central authority nodes according to the comparison.

In addition to being aligned, nodes are authenticated to one another by generating a nonce, N, at the central authority node; encrypting the nonce with a frozen DAK; transmitting the nonce and the encrypted nonce to a user node; decrypting the encrypted nonce at the user node with a frozen DAK; and comparing the decrypted nonce with the nonce. Then, both nodes calculate $N^2$. If the user node determines that the decrypted nonce is equal to the nonce, then the user node transmits an encrypted version of $N^2$ back to the central authority node, encrypting it with its DAK. The central authority node receives the encrypted $N^2$ and decrypts it with its DAK. Finally, the central authority compares the decrypted $N^2$ to $N^2$, and if it finds them equal, mutual authentication was successful.

Once a central authority has synchronized and authenticated itself to a user, the central authority generates an initial DSK; encrypts the initial DSK with the DAK that is aligned with that user; and transmits the encrypted initial DSK to that user. The same initial DSK is sent to both the source and destination users, encrypted with their corresponding aligned DAKs so that they can start a secure communication session. After having received the identical initial DSK from the central authority, each user, source and destination, regenerates new DSKs based on previous DSKs and the data that was created at the source user node.

The present invention is further a system for providing a secure data stream between a source programmable apparatus and a destination programmable apparatus. The system comprises: a source programmable apparatus; a data stream created by the source programmable apparatus; means for encrypting data of the data stream with a DSK; and means for regenerating a new DSK using data from the data stream. The system also includes a destination programmable apparatus in electrical communication with the source programmable apparatus; means for transmitting encrypted data to the destination programmable apparatus; means for decrypting the encrypted data received at the destination programmable apparatus with a DSK; and means for regenerating a new DSK using decrypted data.

In a second embodiment, the present invention is a method of providing secure authentication between wireless communication network nodes. The method includes the steps of providing a node identifier comprising an address and an initial authentication key; installing the node identifier at a first network node, which is preferably a supplicant or an access point; storing the node identifier at a second network node, which is preferably an access point or an authentication server; sending node identifier information from a first network node to a second network node; and synchronously regenerating an authentication key at two network nodes based upon node identifier information. Sending node identifier information from a first network node to a second network node includes comparing the sent node identifier address to the stored node identifier and determining an associated authentication key.

The step of sending node identifier information from the first to the second node preferably comprises encrypting the node identifier address with the initial authentication key and sending the node identifier address and encrypted node identifier address to the second network node. The sent node identifier address is then compared to the stored node identifier at the second network node and the associated authentication key is determined. The second node decrypts the node identifier address with the associated authentication key and compares the decrypted node identifier address to the sent node identifier address in order to authenticate the first node.

To mutually authenticate, the second node then encrypts a function of the node identifier address with the associated authentication key and sends encrypted function back to the first network node. The first node then decrypts the encrypted function with its initial authentication key, and compares the decrypted function to the locally computed function to authenticate the second node.

Upon authentication each node begins the step of synchronously regenerating an authentication key based upon node identifier information. Authentication keys are regenerated based upon the initial authentication key while maintaining a number regeneration counter. An authentication key is buffered every $\Delta t$ time period.

The method of the second embodiment further includes requesting a secure connection from a first network node to a second network node. The method includes the steps of generating a nonce, encrypting the nonce with the initial authentication key, and sending the node identifier address, nonce and encrypted nonce from a first network node to a second network node. The second node forwards the node identifier address, nonce and encrypted nonce to a third network node, preferably an authentication server. Upon forwarding this information, the third node compares the sent node identifier address to a stored node identifier and determines an associated authentication key. The third node decrypts the encrypted nonce with the associated authentication key and compares the decrypted nonce to the sent nonce. Upon equality, the third node authenticates the first node.

The third node then passes the operation back to the second node, in this example, an access point, by encrypting an authentication key and a number regeneration count of the first node with an authentication key of the second node and sending them to the second node. The second node encrypts a function of the nonce with the received authentication key of the first node and sends the encrypted function to the first node.

The first node decrypts the encrypted function with its authentication key and compares the decrypted function to the locally computed function. Upon equality, a secure connection is established between the first and second nodes.

The method additionally includes steps for securing a seamless handover from one node to another, such as when a supplicant migrates from one access point to another. The method includes the steps of sending a handover request with a buffered authentication key from a first network node, preferably a supplicant, to a second network node, preferably a first access point; deassociating the first network node with the second network node; connecting a first network node to a third network node, preferably a second access point; and regenerating an authentication key at the third network node based upon the buffered authentication key. Alternatively, the method includes establishing a connection between a first network node, preferably a supplicant, and a second network node, preferably a first access point; roaming for a third network node, preferably a second access point; determining whether the first network node was connected to the third network node within a previous time period $\Delta t$; sending a handover request with a buffered authentication key including third network node information from the first network node to the second network node; sending a buffered authentication key and number regeneration count of the first network node to the third network node; connecting a first network node to a third network node; and regenerating an authentication key at the first and third network nodes based upon the buffered authentication key.

The second embodiment of the present invention is further a method of providing dynamic security authentication between wireless communication network nodes including the steps of providing at least two network nodes, assigning an initial authentication key and an address to a first node, communicating the address from a first node to a second node, and regenerating authentication keys at the first and second nodes based upon the initial authentication key. Additionally, the method includes maintaining a number regeneration counter associated with the regeneration of authentication keys. An authentication key and associated number regeneration count are buffered every time period $\Delta t$.

The present invention is still further a network for providing secure authentication between wireless communication network nodes. The network includes a first network node, a node identifier comprising an address and an initial authentication key associated with the first network node, a second network node having means for storing the node identifier, a communication channel between the first and second network nodes, and means for synchronously regenerating an authentication key at the first and second network nodes based upon the node identifier.

A primary object of the present invention is to provide a dynamic encryption method and system having no static keys, public or private, that are susceptible to a security breach. Another primary object of the invention is to provide improved security to a data stream between a source and destination user, in particular to provide improved security against a super-user having insider privileges. Another primary object of the present invention is to provide such improved security at a high speed, in a secure system environment, via mutually authenticated users and CAs. Still another primary object of the present invention is to provide a means for mutually secure authentication of wireless communication network nodes.

A primary advantage of the present invention is that it is fully automated, with all system nodes synchronized and mutually authenticated, to ensure security. Another primary advantage of the invention is that it is simple and fast, yet secure against spying by an internal super-user or outside intruder due to the large number of dynamic keys (n) that would need to be broken or compromised—one key per ciphered data record, (n) parallel sessions of encryption, and zero entropy of the ciphered text. Yet another primary advantage of the invention is that it minimizes the exchange of keys between users and/or the CA. Still yet another advantage of the invention is that an initial DAK is securely exchanged between a user and CA which is continuously regenerated during the entire life of the user, allowing the user and CA to synchronize (realign DAKs) and authenticate to one another as needed for a communication session or when there is a disaster misalignment between a user and CA. Yet another primary advantage of the present invention is dynamic, secure authentication of wireless communication network nodes. And yet another primary advantage of the present invention is the minimization of wasted bandwidth in wireless communication networks.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate preferred embodiments of the present invention and, together with the description, serve to explain the principles of the invention. The drawings are not to be construed as limiting the invention.

Figure 1B:
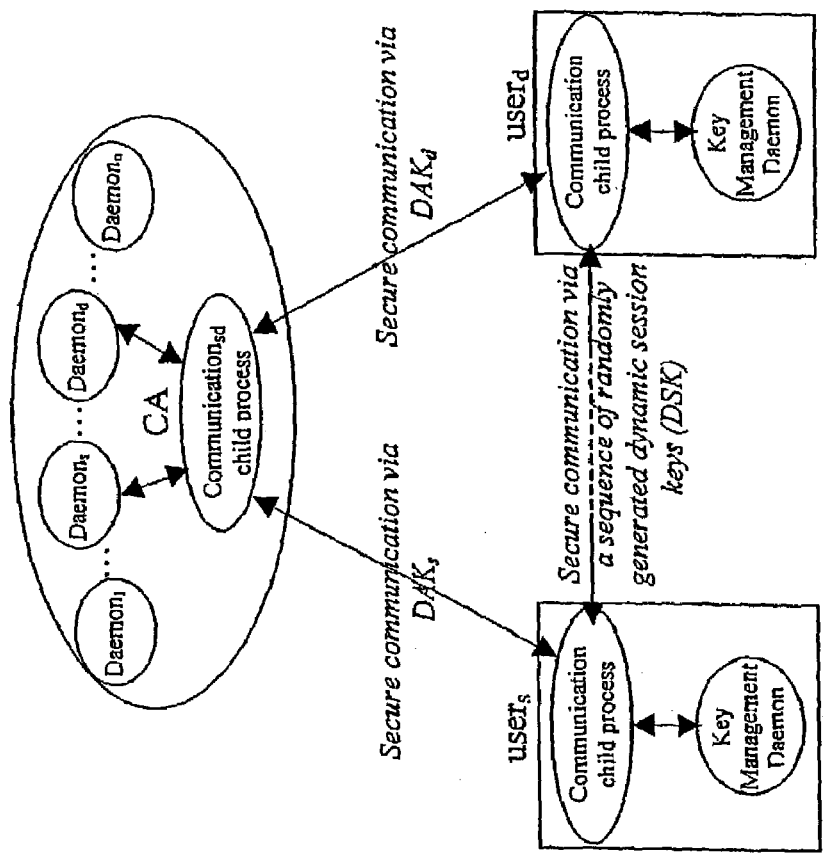
FIG. 1b is a diagrammatic overview of secure communication between users in accordance with the present invention.

DESCRIPTION OF THE PREFERRED EMBODIMENTS (BEST MODES FOR CARRYING OUT THE INVENTION)

Computer System Security

In a first embodiment, the present invention is a dynamic symmetric key encryption method and system for network security. The invention is implemented between end-users (U) and central authentication authorities (CAs) for user authentication purposes, and between end-users for secure exchange of digital data. The users and CA reside at their respective nodes, or programmable apparatuses, such as at one or more computers, and are in electrical communication, such as via a computer network. Communicated data flows over a data stream between the user and CA programmable apparatuses. Computer-readable memory provides storage for the data, dynamically changing keys, and other variables, as needed to allow for the regeneration of subsequent dynamic keys, and to carry out other necessary processes within the computer. Means are provided on the programmable apparatuses for performing all of the various methods involved in the dynamic encryption method. Such means include primarily computer-readable means, such as software, and the necessary related hardware.

The encryption method of the present invention distributes the complexity of the encryption algorithm over the dynamics of the data exchange, involving the exchanged data as well as the previous key in the process of regenerating a "dynamic" encryption key; i.e., $KEY_{new} = F(KEY_{previous}, DATA\_RECORD_{current})$, where F is a key regeneration function. Thus, there is a newly generated key for the encryption of every data record, yielding zero entropy between the cipher and the plain data. There are no static keys, public or private, that are susceptible to a security breach. In order to guarantee security, the encryption method of the present invention is preferably deployed in a system of registered end-users with a CA, whereby the CA maintains user connections' authentication and secures distribution of symmetric encryption session keys.

The invention employs two types of dynamic keys, namely dynamic authentication keys (DAK) and dynamic session keys (DSK). The former is used to mutually authenticate users and CAs; it is continuously regenerated throughout the existence of the user and the CA. The latter exists when the need arises for a secure data exchange session between users; its regeneration is maintained only through the life cycle of such a session. The placement of the initial DSK at users' nodes is securely carried out by the CA, and encrypted using the users' DAKs. The CA maintains an array of DAKs, one per user.

The invention further employs an auxiliary static key K, which is formed based on the DSK and the DAK, given that the user has established a session; otherwise, it is formed from the initial DAK only. This static key is continuously involved in the regeneration of the DAK. The auxiliary static key adds another dimension of security to the process against insider attacks, as it involves more dynamics to the regeneration of the DAK by allowing the contribution of the DSK to the process, every new communication session between users. The static nature of K is not to be exploited by the attacker since its exploitation does not lead to any important information; its relation to the DSK and the DAK is not reversible, i.e., K is manufactured from DSK and DAK, yet neither DSK nor DAK can be obtained from K.

The major role of the CA is to maintain the registered users' DAKs generation and the secure delivery of symmetric session keys (DSKs) between the users. The CA also authenticates the source user to the destination user and vice versa, while authenticating itself to both users. Unless a user is pre-registered with the CA, it is nearly impossible for an intruder to have the same synchronized dynamic key with the CA, as a registered user. The only explicit user identity verification is carried out once, at the time the user first registers with the CA. Any consequent authentication is implicitly processed, without the need to exchange any plain keys, which would require a secure channel. The authentication method involves the three parties to any connection: source user, destination user, and CA, authenticating each other via their corresponding synchronized dynamic key.

Figure 1A:
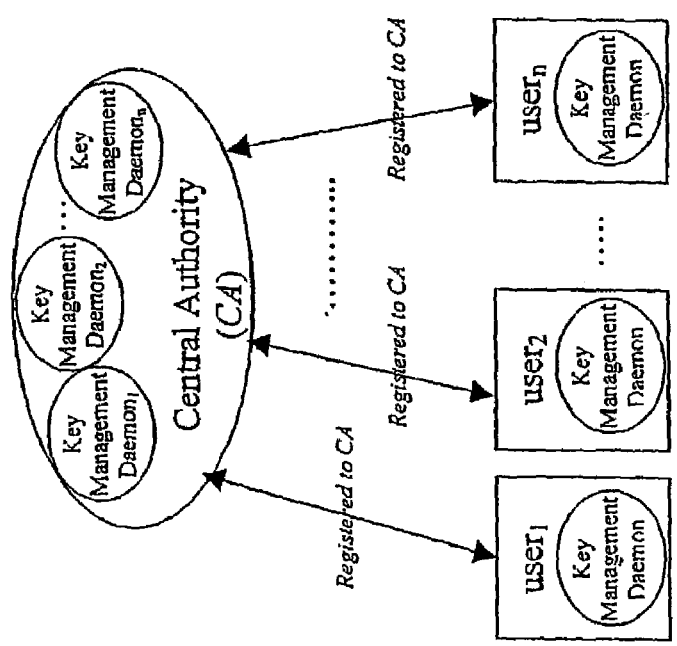
FIG. 1a is a diagrammatic overview of a central authority (CA) generating daemons to manage users' dynamic authentication keys (DAKs) in accordance with the present invention.

Referring to FIG. 1a, a diagrammatic overview of a CA generating daemons to manage users' dynamic authentication keys (DAKs) in accordance with the present invention is shown. Registration of trusted users, users that have for example, provided a valid certificate of authentication or who are referred by a previously-registered third party user, occurs over a secure channel, for example, using RSA encryption, where the CA provides the user with an initial DAK. Referring to FIG. 1b, a diagrammatic overview of user communication encrypted with a dynamic session key (DSK) initially generated and sent by a CA is shown. Upon any user's connection request, a communication child process is forked at the CA, as well as at the user node. Each child process runs on the behalf of its parent during the whole communication session in order to avoid disturbance of the DAK generation process in the event of synchronization or authentication failure, for example, due to a false connection request, hardware failure, etc.

The CA is responsible for secure user authentication and generation of the initial trusted user dynamic authentication key, DAK. Every user must register with the CA in order to obtain its initial DAK, which is exchanged via a secure channel, e.g., using RSA. Upon the initiation of any new user's secure data exchange session, both end-users and the CA freeze their DAK generation and synchronize by establishing the same dynamic change. After the user and the CA are synchronized (their DAKs are aligned), they both yield the same randomly generated DAK at both nodes. This DAK is used in the authentication method as the encryption and decryption key, because it is maintained only by the CA and the user.

Figure 2:
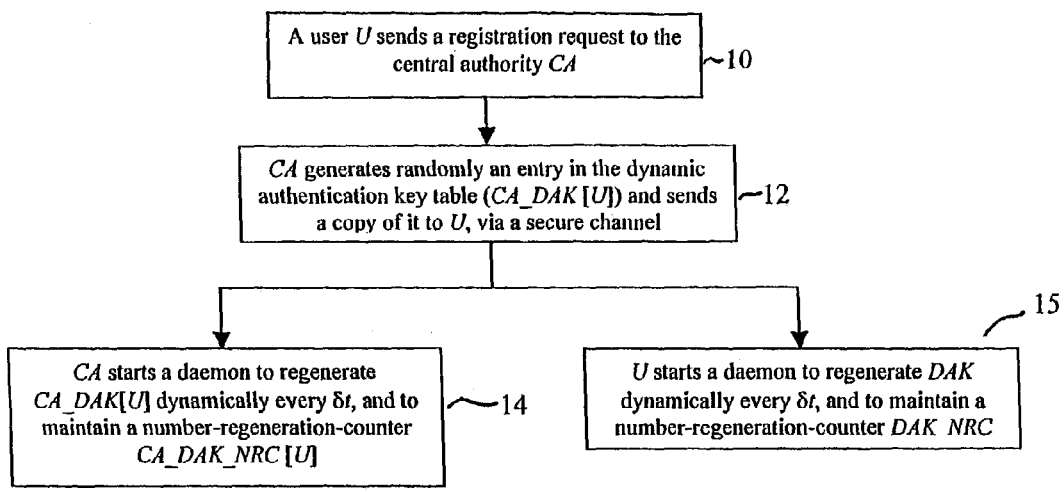
FIG. 2 is a diagrammatic illustration of a user registration request to a CA in accordance with the present invention.

Referring to FIG. 2, a diagram further illustrates the user registration method with a CA. The user starts the registration process by sending a request 10, effectively requesting the generation of an initial value of its DAK, to the CA including authenticated documentation of its identity and purpose of registration, i.e. revealing it is a trusted user. Upon approval of the user's credentials by the CA, the CA starts a daemon related to the requesting user, and randomly selects an initial DAK, sending a copy to the user via a secure channel 12, for example, using the well-known RSA technique where the CA uses the user's public key to encrypt the newly generated DAK. Then the CA starts a daemon that permanently regenerates the DAK. Upon the reception of the initial DAK, the user starts a daemon in order to permanently regenerate the DAK. From that point forward, the user and CA randomly regenerate the next DAK every δt period, 14, 15, based on the previous generated DAK and the auxiliary static key K. The user and CA also maintain a number-regeneration-counter (NRC). This method of regenerating new DAKs is depicted in greater detail in FIGS. 14 and 15.

Figure 14:
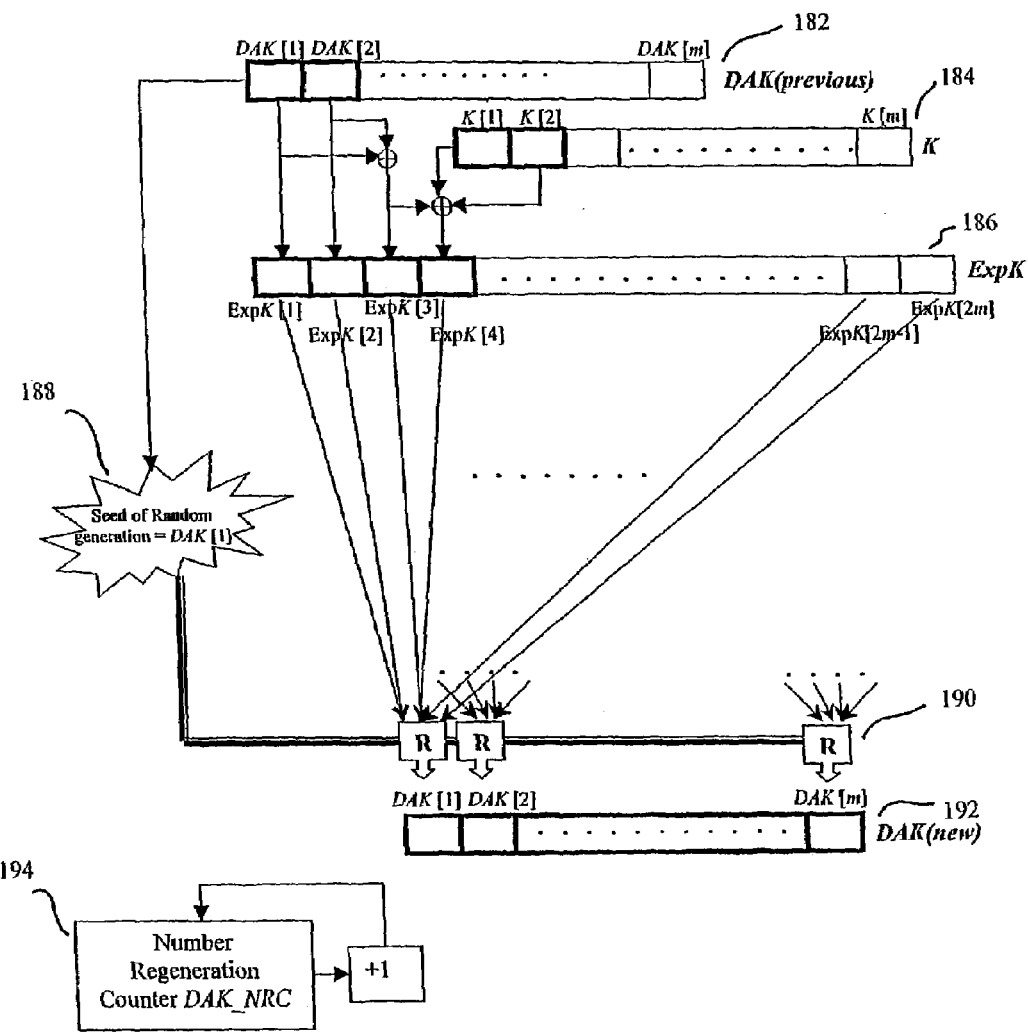
FIG. 14 is a diagrammatic illustration of the DAK regeneration method of the present invention.

Referring to FIG. 14, a diagram illustrates the continuous DAK regeneration method, where DAK[j] represents the $j^{th}$ byte of the dynamic authentication key, K[j] represents the $j^{th}$ byte of the auxiliary static key, ExpK[h] represents the $h^{th}$ byte of an "expanded key", $1 \leq j \leq m$, $1 \leq h \leq 2m$. Each unit R represents the random selection of one byte among the ExpK's 2m bytes. An expanded key, ExpK 186 of twice the size of the DAK 182 is generated as follows. Each of the DAK, K, and ExpK are divided into (m/2) regions, indexed from 1 to (m/2). Each region of DAK 182 and DSK, 184 is of length 2 bytes, and each region of ExpK, 186 is 4 bytes. The indices of the four consecutive bytes of any region r in the ExpK are indexed with the values: 4r-3, 4r-2, 4r-1, and 4r. The indices of the two consecutive bytes of any region r, in the DAK and K, are indexed with the values: 2r-1 and 2r. The four bytes of region r in the ExpK are filled from DAK and K as follows:

Expk[4r-3]←DAK[2r-1]

ExpK[4r-2]←DAK[2r]

ExpK[4r-1]←(DAK[2r-1]) XOR (DAK[2r])

ExpK[4r]←(DAK[2r-1]) XOR (DAK[2r]) XOR (K[2r-1]) XOR (K[2r])

It will be understood by those of skill in the art that, ExpK can alternatively be comprised of any number of bytes, e.g., 2m, 3m, 8m, etc., and the invention is not limited to any particular size for ExpK. If ExpK were of a different, greater number of bytes than 2m, then the logic operation would be altered as needed to fill the bytes of ExpK. It will also be understood that the byte positions chosen to be XORed together to fill the positions of ExpK could similarly be altered, and still remain within the inventive scope of the dynamic encryption and authentication method. Similarly, alternative logic operations could be substituted for the XOR operation.

Once ExpK is created, a random selection of m bytes from the 2m bytes of ExpK is taken 190 based on the first byte of the DAK (DAK[1]) as the random function seed 188. Alternatively, a randomly selected byte of the DAK can be used as the random function seed. This function generates a sequence of m random numbers in the range between 1 and 2m each of which represents the index of the ExpK byte to be placed as the next byte of the regenerated DAK 192. The operation depicted in FIG. 14 is performed at both the user and the CA nodes. In order to maintain synchronization control, a number-regeneration-count for the dynamic authentication key (DAK_NRC) 194 is maintained and incremented after each DAK regeneration. This method can be performed periodically or a periodically (with mutual consent of CA and the user) according to the implementation of the invention.

Figure 15A:
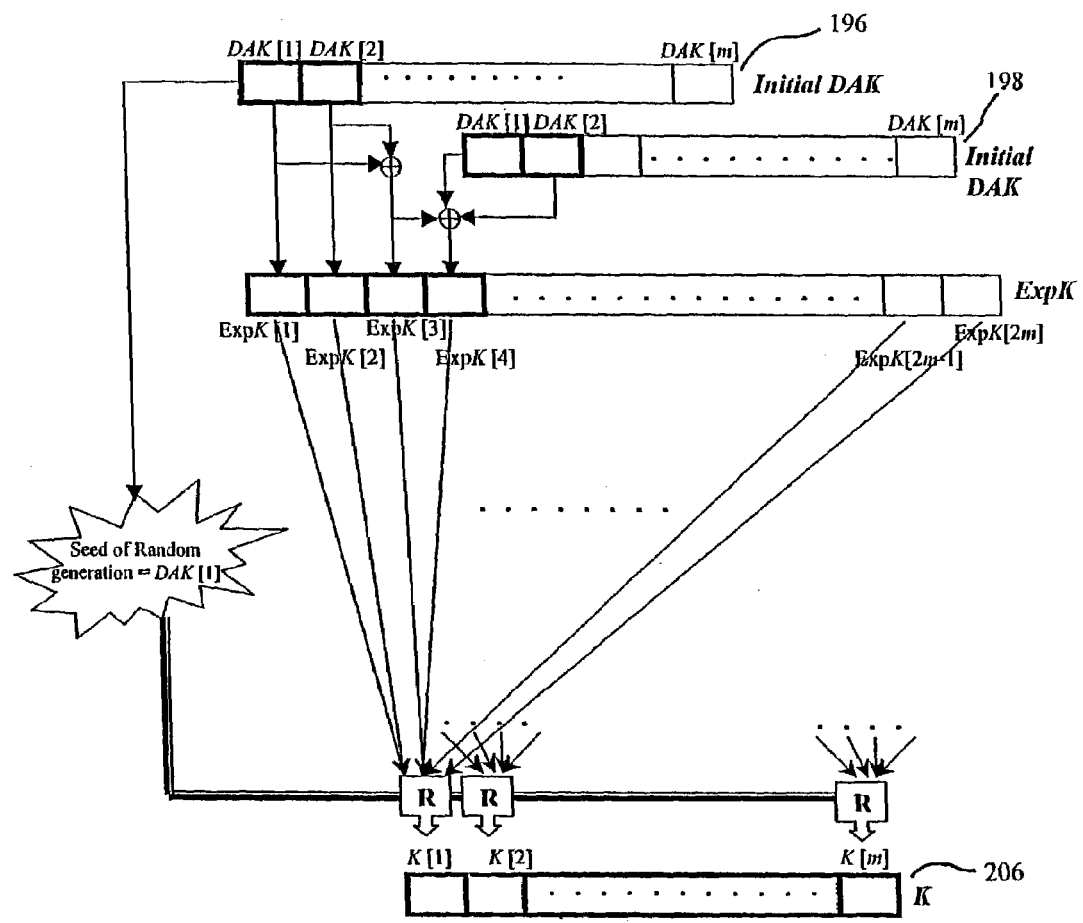
FIG. 15a is a diagrammatic illustration of the formation of the auxiliary static key using the initial DAK in accordance with the present invention.
Figure 15B:
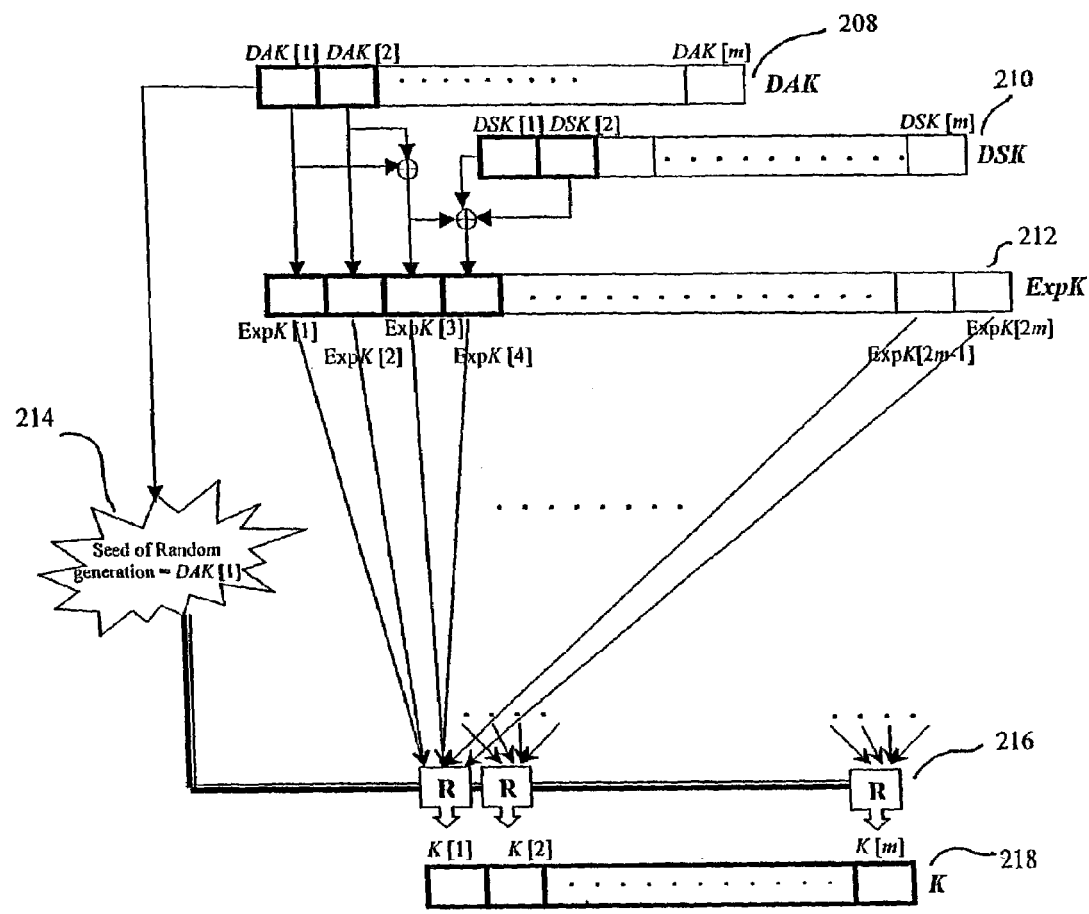
FIG. 15b is a diagrammatic illustration of the formation of the auxiliary static key using the DAK and previous DSK in accordance with the present invention.

Continuing on to FIGS. 15a and 15b, a diagram illustrates the method of forming the auxiliary static key K. FIG. 15b illustrates the formation of K using the CA-user aligned DAK, where DAK[j] represents the $j^{th}$ byte of the dynamic authentication key, DSK[j] represents the $j^{th}$ byte of the last dynamic session key, K[j] represents the $j^{th}$ byte of the auxiliary static key K, and ExpK[h] represents the $h^{th}$ byte of an "expanded key", $1 \leq j \leq m$, $1 \leq h \leq 2m$. Each unit R represents the random selection of one byte among the ExpK's 2 m bytes. Each static key K is created using the CA-user aligned DAK, 208 and the last user session DSK, 210. First, an expanded key (ExpK), 212, of twice the size of K is generated. Each of the DAK and the DSK is divided into (m/2) regions, indexed from 1 to (m/2). Each region of the DAK and the DSK is of length 2 bytes, and each region of ExpK is 4 bytes. The indexes of the four consecutive bytes of any region r, in the ExpK, are indexed with the values: 4r-3, 4r-2, 4r-1, and 4r. The indexes of the two consecutive bytes of any region r, in the DAK and the DSK, are indexed with the values: 2r-1 and 2r. The four bytes of region r in the ExpK are filled from DAK and DSK as follows:

ExpK[4r-3]←DAK[2r-1]
ExpK[4r-2]←DAK[2r]
ExpK[4r-1]←(DAK[2r-1]) XOR (DAK[2r])
ExpK[4r]←(DAK[2r-1]) XOR (DAK[2r]) XOR (DSK [2r-1]) XOR (DSK[2r])

Then, a random selection of m bytes from the 2m bytes of ExpK is performed, 216, based on the DAK[1] byte as the random function seed, 214. Alternatively, any randomly selected byte can serve as the random function seed. This function generates a sequence of m random numbers, in the range between 1 and 2m, each of which represents the index of the byte to be placed as the next byte of K, 218. This operation is performed at both the source and destination user nodes. This method is used to form K when a user communication session is taking place and DSKs are being regenerated.

FIG. 15a illustrates the formation of K, 206 using the two copies of the initial CA-user aligned DAK, 196, 198. This method is used to form K when a communication session is not taking place, i.e., the user DSK does not exist. Thus, the mechanism of FIG. 15a follows the same pattern as FIG. 15b, except replacing the non-existing DSK by another copy of the initial DAK.

Returning to FIG. 3, a diagrammatic overview of synchronization and authentication between users and a CA, and initial generation of the DSK by the CA is shown. DAK regeneration starts at both the user and the CA nodes, upon user registration, where each generates the same sequence of random DAKs, with the initial DAK as a seed, even after the user-CA connection is terminated. Thus, key exchange between users, as well as between users and the CA, is minimized to maintain a high level of security. Users and the CA instead remain synchronized at all times with respect to DAK regeneration. When the user-CA connection is terminated after initial request for user registration with the CA, synchronized DAK regeneration continues off-line. Permanent regeneration of the DAK is maintained via a daemon running at each registered user, and a corresponding daemon running at the CA.

Figure 3:
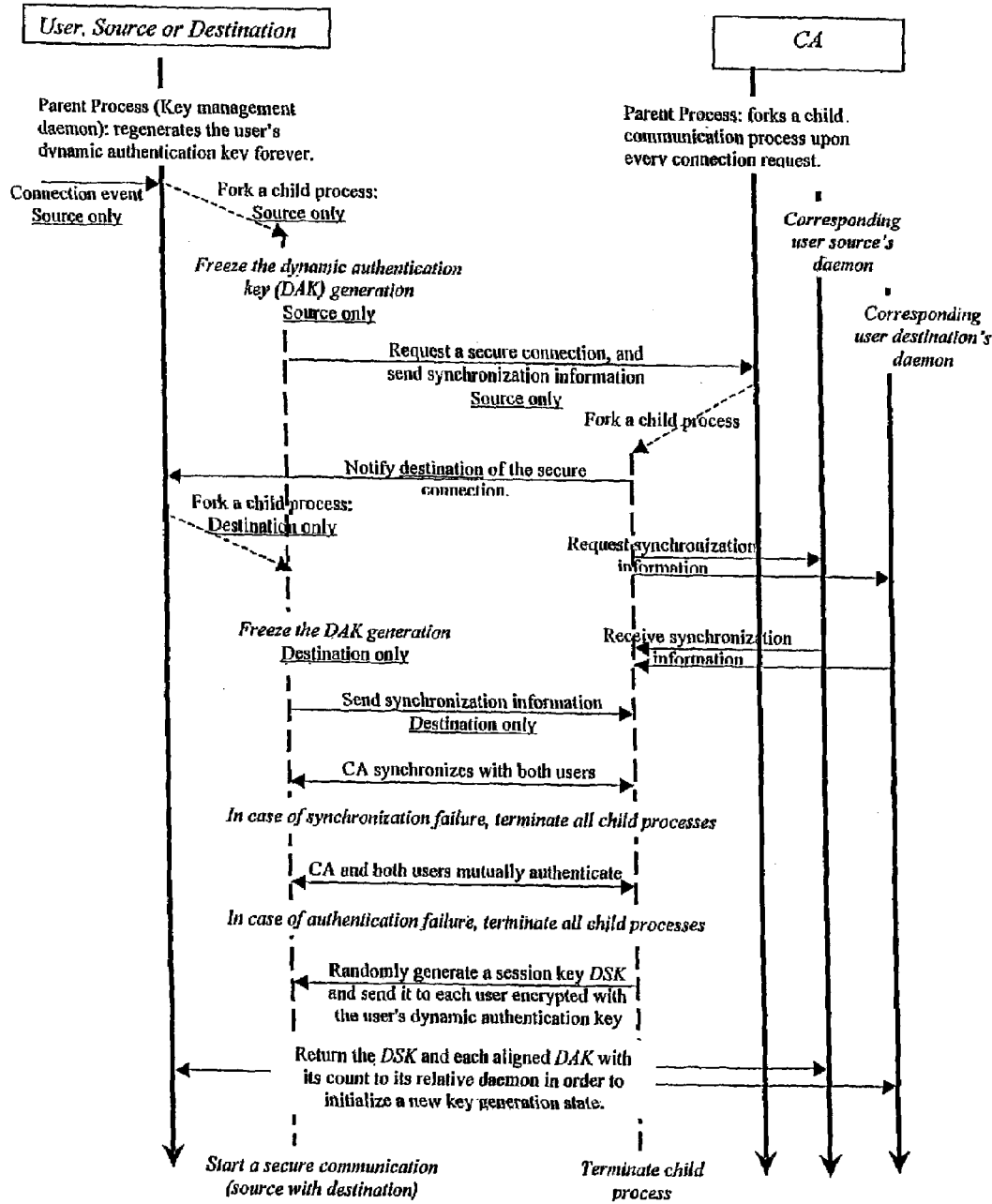
FIG. 3 is a diagrammatic overview of synchronization and authentication between users and a CA, and initial generation of the DSK by the CA in accordance with the present invention.

With continuing reference to the center portion of the diagram of FIG. 3, in order to establish a connection between a source user $U_s$ and a destination user $U_d$, $U_s$'s DAK regeneration daemon forks a child communication process $U_s\_COM$, which freezes its version of the DAK and its NRC, and sends a connection request to the CA including synchronization information. Upon the reception of such request, the CA's communication server forks a communication child process CA_COM, which will notify $U_d$ of the connection with $U_s$. Upon the acceptance by $U_d$ to the connection, $U_d$'s DAK regeneration daemon forks a child communication process $U_d\_COM$, which freezes its version of the DAK and its NRC, and sends synchronization information back to the CA_COM. Then, the CA_COM snapshots both users' DAKs/NRCs from their corresponding CA's DAK daemons, and starts the synchronization and authentication processes with both users' communication child processes.

Upon successful mutual synchronization and authentication involving the three session parties, the CA_COM generates a random dynamic session key (DSK) and encrypts it using the aligned DAK of each user, and sends it to both users. After receiving the encrypted DSK, each of the two users' child communication process decrypts it using its respective aligned DAK, and starts a secure communication session with the other child communication process, via the decrypted DSK.

In case of failure, the child processes are terminated without interruption to the parent processes and/or daemons. This feature provides protection against a "synchronization disturbance" attack. In such an attack, an intruder imitating a registered user or a CA might force the three DAK number-regeneration-counters (NRCs) to freeze, which will create a chaotic state, but only in the child processes. The counters are continuously counting, i.e., DAKs are continuously regenerated, in the daemons without stopping, except when rebooting. The child processes snapshot, or "freeze", the DAK/NRC for use in the synchronization, authentication, and secure DSK exchange. Thus, the continuously running DAK daemons are unaffected in the parent processes in the event of a failure to establish a connection, or in the event of a synchronization disturbance.

However, in the event of successful synchronization and authentication, the child processes at the users' nodes return the aligned DAK and the newly generated DSK to their respective parent daemons in order to initialize a new state for DAK regeneration, forcing the daemon to discard the current value of DAK and DSK (if exists), and consider the newly returned versions in the DAK regeneration process. Also, the CA_COM return the two aligned DAKs and the newly generated DSK to their respective DAK daemons at the CA in order to initialize a new state for DAK regeneration, forcing both local users' daemons to discard their current DAK and DSK (if exists) values, and consider the newly returned versions in the DAK regeneration process. Then, the CA_COM terminates successfully, whereas the $U_s\_COM$ and $U_d\_COM$ start a secure communication.

Figure 4:
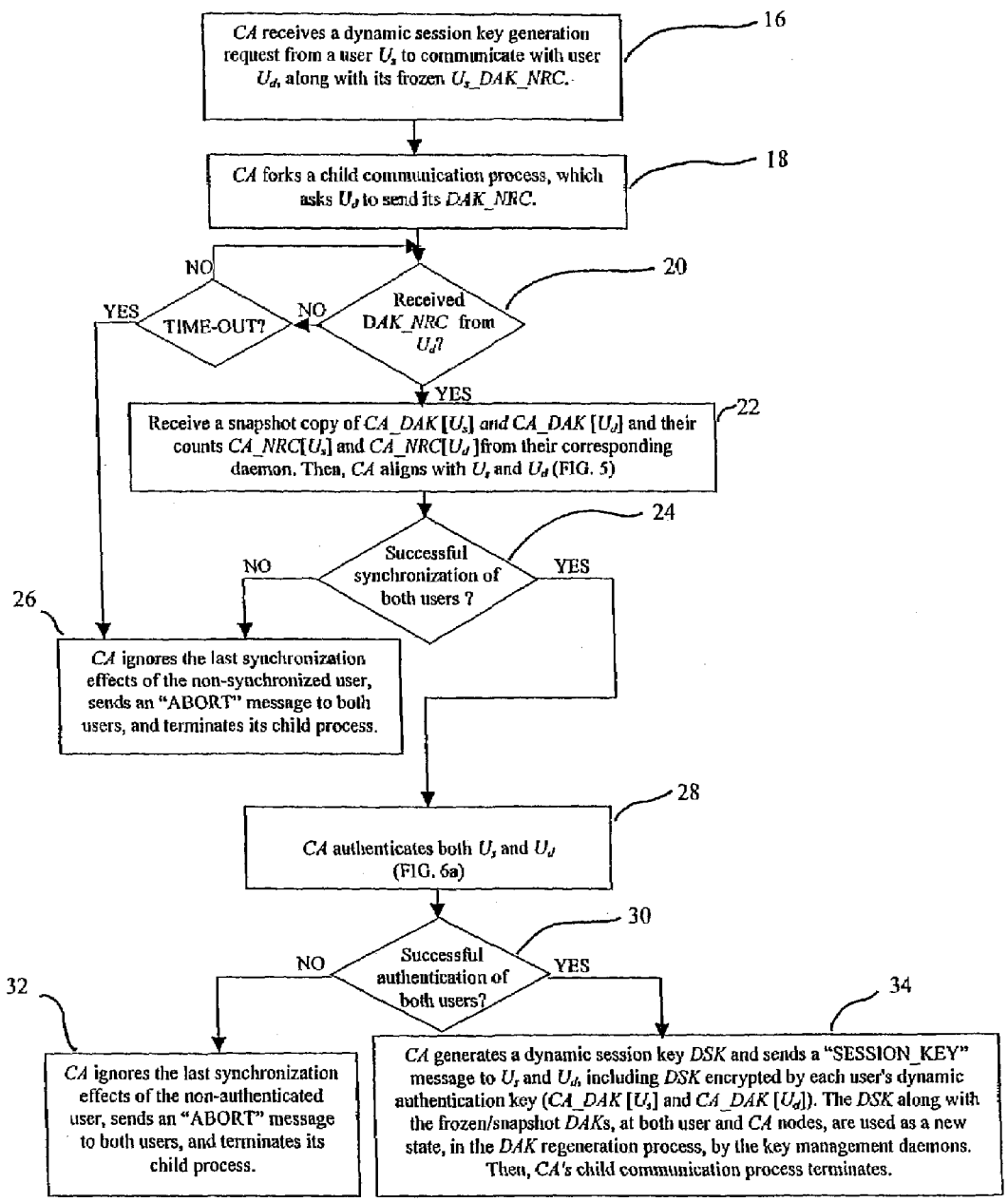
FIG. 4 is a diagrammatic illustration detailing the method of FIG. 3.

Referring to FIG. 4, a diagrammatic overview of synchronization, authentication, and generation of DSK by a CA in response to a request from a source user ($U_s$) to communicate with a destination user ($U_d$) is provided. (See also FIG. 3.) Source user $U_s$ requests a DSK generation from CA to communicate with destination user $U_d$, and sends its frozen DAK_NRC along with the request, 16. The CA forks a CA_COM, which snapshots the two users DAKs, namely CA_DAK[$U_s$] and CA_DAK[$U_d$], and requests $U_d$ to send its DAK_NRC, 18. This request notifies $U_d$ that $U_s$ is trying to establish a secure communication with it. Once the CA has received the $U_d$ DAK_NRC, 20, the synchronization process is initiated, 22.

Synchronization ensures that the CA has DAK values identical to the users' DAK values, despite message propagation delay. The CA ensures that its locally snapshot DAK for $U_s$ and the corresponding frozen DAK at $U_s$'s node are aligned, and also ensures that its locally snapshot DAK for $U_d$ and the corresponding frozen DAK at $U_d$'s node, are aligned. To compensate for propagation delay and align the corresponding CA's DAK with each of the parties' DAKs, the difference (x) in the number of key regeneration counts (NRCs), between CA and each user, will be considered by the lagging party, which will regenerate its DAK an extra x times (See FIG. 5.)

If alignment is not achieved with both users, 26, CA ignores the synchronization effects from the non-synchronized user(s), sends an abort message to both users before killing its communication child process, and cancels the communication due to lack of synchronization.

Figure 6A:
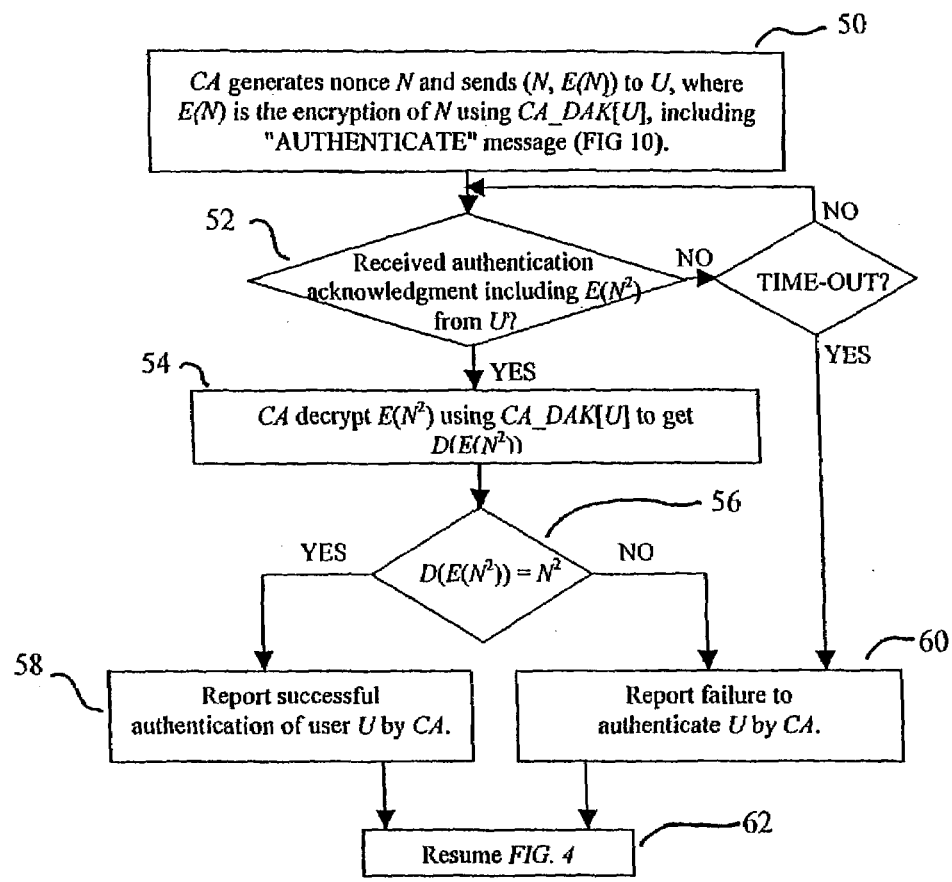
FIG. 6a is a diagrammatic illustration of the method whereby a CA authenticates a user in accordance with the present invention.
Figure 6B:
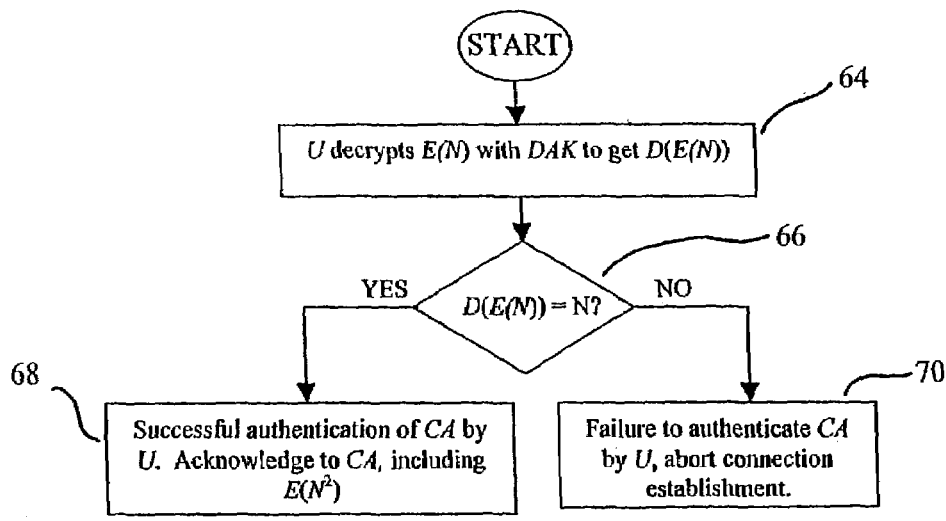
FIG. 6b is a diagrammatic illustration of the method whereby a user authenticates a CA in accordance with the present invention.

In the event of successful synchronization with both users, 24, the CA launches an authentication method, 28, to certify their identity. (FIGS. 6a and 6b.) If successful authentication of both users is not achieved, 32, CA ignores any synchronization effects of the non-authenticated user(s), sends an abort message to both users before killing its communication child process, and cancels the communication due to lack of authentication. If both users are fully authenticated and synchronized with CA, 30, the CA randomly generates an initial DSK and sends it to both users, encrypted with each user's corresponding aligned DAK, to begin data exchange, 34. This encryption process, 34, is identical to the process described in FIG. 11, except that $DSK_i$ is replaced by DAK, and $D_i$ is replaced by the initial DSK. After the entire process is completed, successful or unsuccessful, the CA_COM terminates and returns its status to the parent process.

Figure 5:
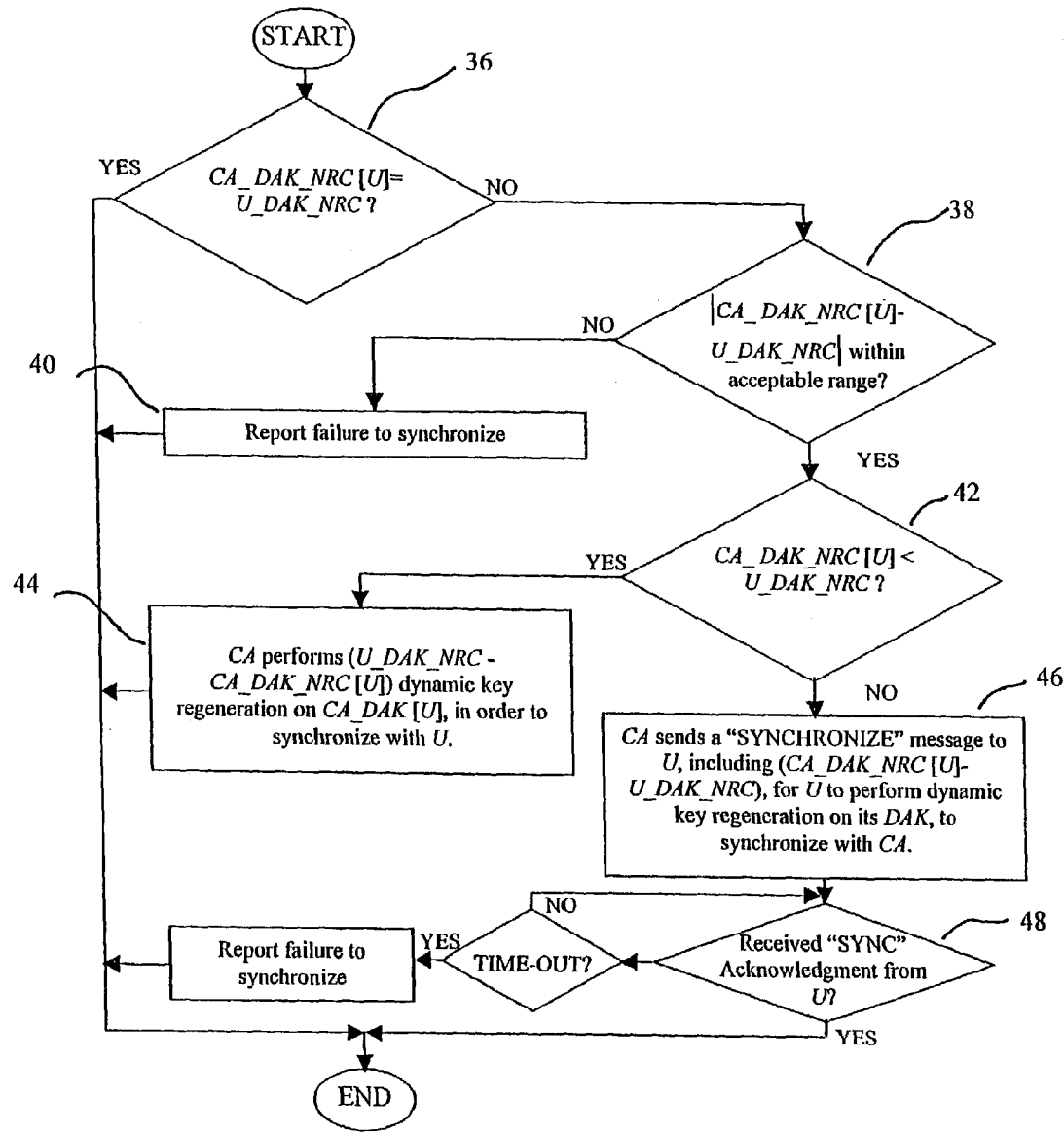
FIG. 5 is a diagrammatic illustration of synchronization of DAKs between a CA and a user in accordance with the present invention.

Referring to FIG. 5, a diagram illustrates synchronization of DAKs between a CA and a user, based on the number-regeneration-count for the DAK at each node. Initially, the number-regeneration-count of the DAK for user (U) at the CA, (CA_DAK_NRC[U]), is compared to the number-regeneration-count of the DAK at the user's node (U_DAK_NRC), 36. If the two NRCs are equal, then the CA and user are synchronized. If the comparison of the NRCs is outside of a predetermined acceptable range, a "failure-to-synchronize" message is reported, 40. This occurs when |CA_DAK_NRC [U]–U_DAK_NRC|, 38, is larger than a predetermined value, and the communication is terminated.

If the comparison of the NRCs is within the predetermined acceptable range, then the lagging party performs a number of DAK regenerations equal to the calculated difference in order to synchronize (i.e., align the DAKs) with the other party. For example, if the CA NRC lags behind that of the user, 42, then the CA performs (U_DAK_NRC–CA_DAK_NRC [U]) regenerations of its DAK in order to align with that of U, 44. If the user NRC lags behind that of the CA, the CA sends a "synchronize" message, including the calculated NRC difference, 46, so that the user can perform the appropriate number of regenerations to synchronize with the CA. Once the user performs the regenerations, it signifies that it has done so to the CA, 48.

Once the parties are synchronized, mutual authentication of DAKs is performed to ensure the parties indeed share the same DAK. FIGS. 6a and 6b illustrate the mutual authentication method. FIG. 6a illustrates authentication of a user by a CA, and FIG. 6b illustrates authentication of a CA by a user. The process begins by CA generating a random number, or nonce, N. CA sends N and E(N) to the user, where E(N) is the encrypted version of N using the CA_DAK[U], the shared and aligned DAK, as well as an "authenticate" message, 50. The user decrypts E(N) using its frozen DAK, which should be identical to CA_DAK[U], that of the CA, 64 and verifies that D(E(N))=N, 66. The user thus authenticates the CA, 68. If D(E(N)) does not equal N, then the user failed to authenticate the CA and the connection is aborted, 70.

When the user has successfully authenticated the CA, 68, the user encrypts $N^2$ with its DAK, ($E(N^2)$), and sends $E(N^2)$ back to the CA, as part of the authentication acknowledgment to complete the authentication process, 68. Upon receiving the authentication acknowledgment back from the user, 52, CA decrypts the received ciphered number, again using the aligned CA_DAK [U], 54 and compares the decrypted value with the value of $N^2$, 56. If they are not equal, the CA reports a failure to authenticate the user, 60, and aborts the establishment of a connection. If they are equal, the user is successfully authenticated by the CA, i.e., has been registered with the CA, 58. CA performs the same mutual authentication method with the second user before user-to-user communication takes place. When all parties have been mutually authenticated, CA proceeds to DSK generation, 62, the last step of FIG. 4.

Figures 7A, 7B:
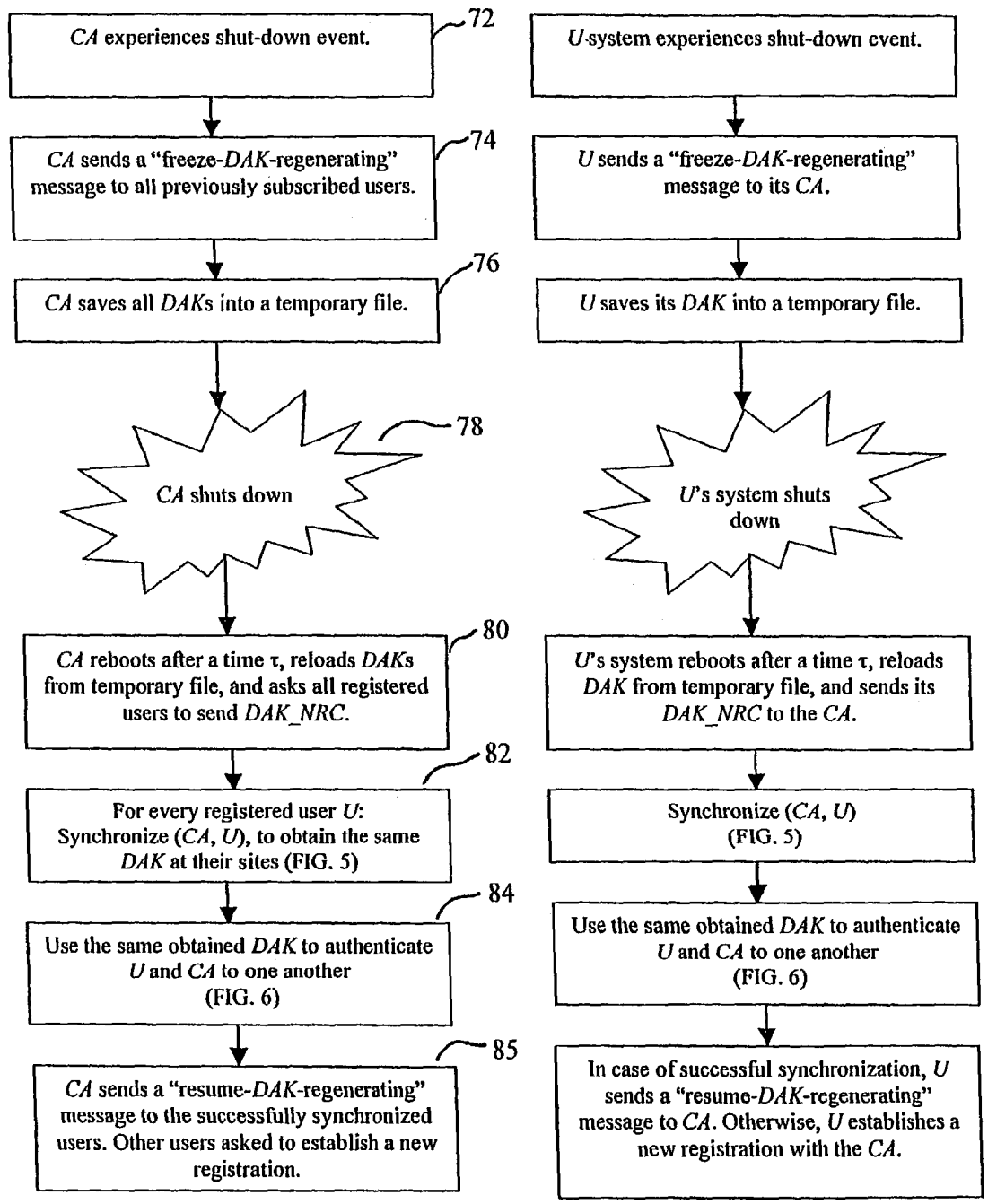
FIG. 7a is a diagrammatic illustration of the method whereby a CA freezes and resumes regeneration of users' DAKs upon occurrence of a CA shutdown event, in accordance with the present invention.
FIG. 7b is a diagrammatic illustration of the method whereby a user freezes and resumes regeneration of its DAK upon occurrence of a user shutdown event, in accordance with the present invention.

As systems are prone to unpredicted shutdown events, such as power loss, the dynamic encryption method and system automatically freezes and resumes key regeneration upon occurrence of such events. Referring to FIG. 7a, a diagram illustrating freezing and resuming regeneration of DAKs when a CA experiences a shutdown event, is shown. FIG. 7b shows freezing and resuming regeneration of DAKs when a user experiences a shutdown event. Referring to FIG. 7a, a CA is shown to experience a shutdown event, 72. The CA immediately sends a "freeze-DAK-regenerating" message to all previously registered users, 74, as part of its shutdown handler routine. Meanwhile, the CA saves all users' DAKs into a temporary file, 76. After shutting down, 78, for a time period τ, the CA reboots and reloads all the previously saved DAKs. The CA then requests the DAK_NRC from all users to ensure validity of the current DAKs, 80. Then, the CA starts the synchronization process, 82 as described with respect to FIG. 5. The CA then initiates the mutual authentication process with all successfully synchronized users, 84. (FIGS. 6a and 6b.) Finally, the CA sends a "resume-DAK-regenerating" message to its registered and successfully synchronized and authenticated users, in order to resume realigned regeneration of the DAKs, 85. A similar method is performed by the user in the event of a user's system shutdown, as depicted in FIG. 7b.

Figure 8:
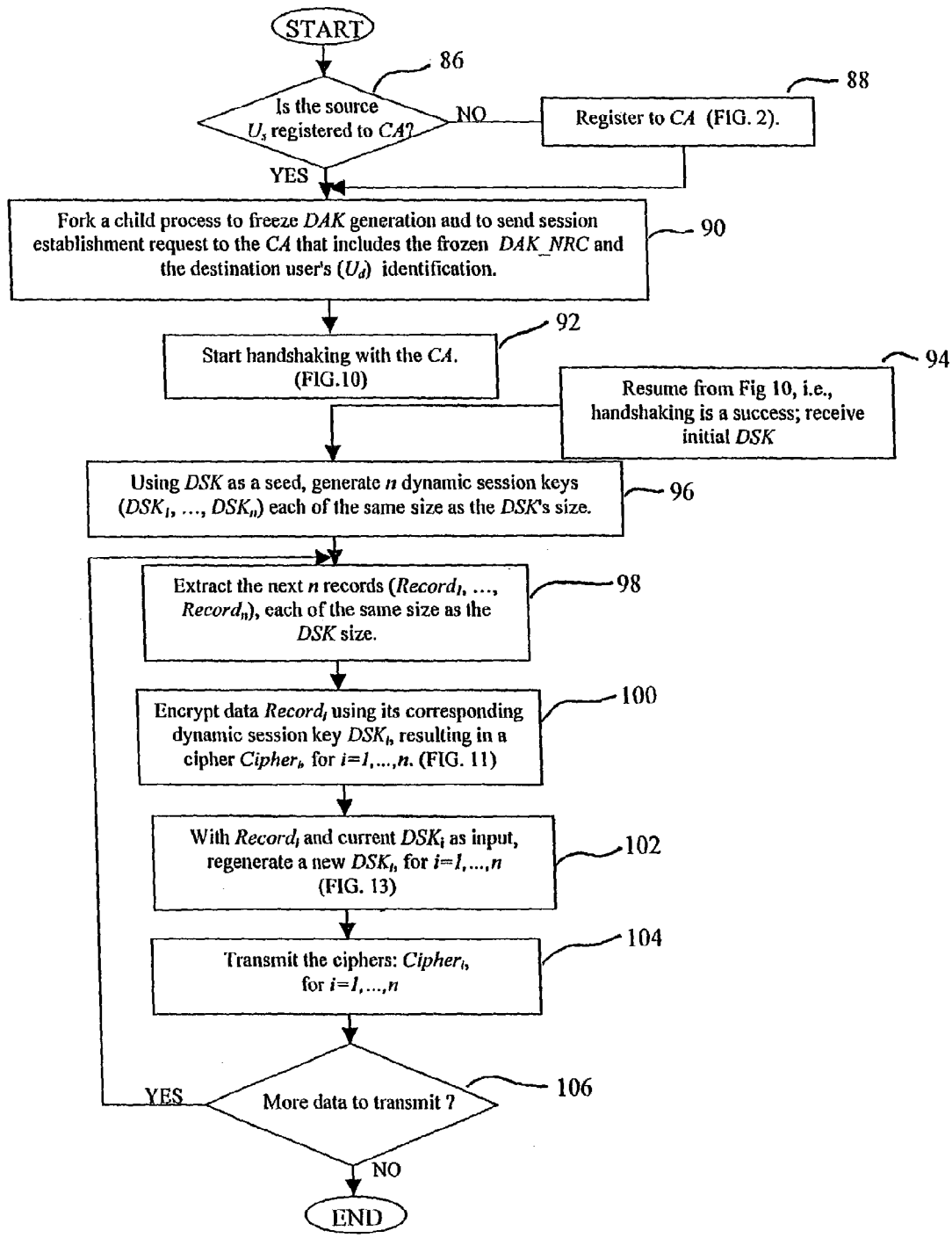
FIG. 8 is a diagrammatic illustration of secure communication establishment at the source user node in accordance with the present invention.

After a user is registered with a CA, the user may request a secure communication with another user. Referring to FIG. 8, a diagram illustrates secure communication establishment at the source user ($U_s$) side. The source user first determines whether it is registered to the CA, 86. If not, the user performs the registration procedure and receives its initial DAK via a common secure channel, 88. (See also FIG. 2.) Then, the source user's DAK daemon forks a child communication process $U_s$_COM, 90, which freezes its DAK generation and runs on behalf of the user until the end of the users' session communication. $U_s$_COM requests a secure connection establishment with the destination user ($U_d$) from the CA, and sends its frozen DAK_NRC for synchronization purposes. In the event of successful handshaking with the CA, 92 (FIG. 10), the source user receives an initial dynamic session key DSK, from the CA, 94.

The $U_s$-$U_d$ data exchange session uses the shared symmetric DSK sent by the CA to both users. However, to increase the level of dynamic encryption to n crypto parallel streams, a set of n updated DSKs is derived randomly from the initial DSK, used as a seed, sent by CA. The source user message is stepped through n records, or a "block", at a time, and the first n DSKs generated are used to encrypt the first block of n records. After that, n DSKs are regenerated for each consecutive block, as a function of the previously generated n DSKs and their corresponding n data records. (See FIG. 13.)

This process is depicted in FIG. 8 after the source user has had successful handshaking, 94. The source user first generates randomly n different DSKs ($DSK_i$, where $1 \leq i \leq n$), of the same size as the initial DSK, 96. Then, n data records of the same size as the size of DSK ($Record_i$, where $1 \leq i \leq n$) are extracted from the input data, 98, and encrypted 100. Next, for every $Record_i$ and its current $DSK_i$ as input, a new $DSK_i$ is regenerated, 102. This is depicted in greater detail in FIG. 13, on a byte-by-byte basis. Finally, the n ciphered records are transmitted to $U_d$, 104. The encryption method described at 100 of FIG. 8 is illustrated in greater detail in FIG. 11.

Figure 11:
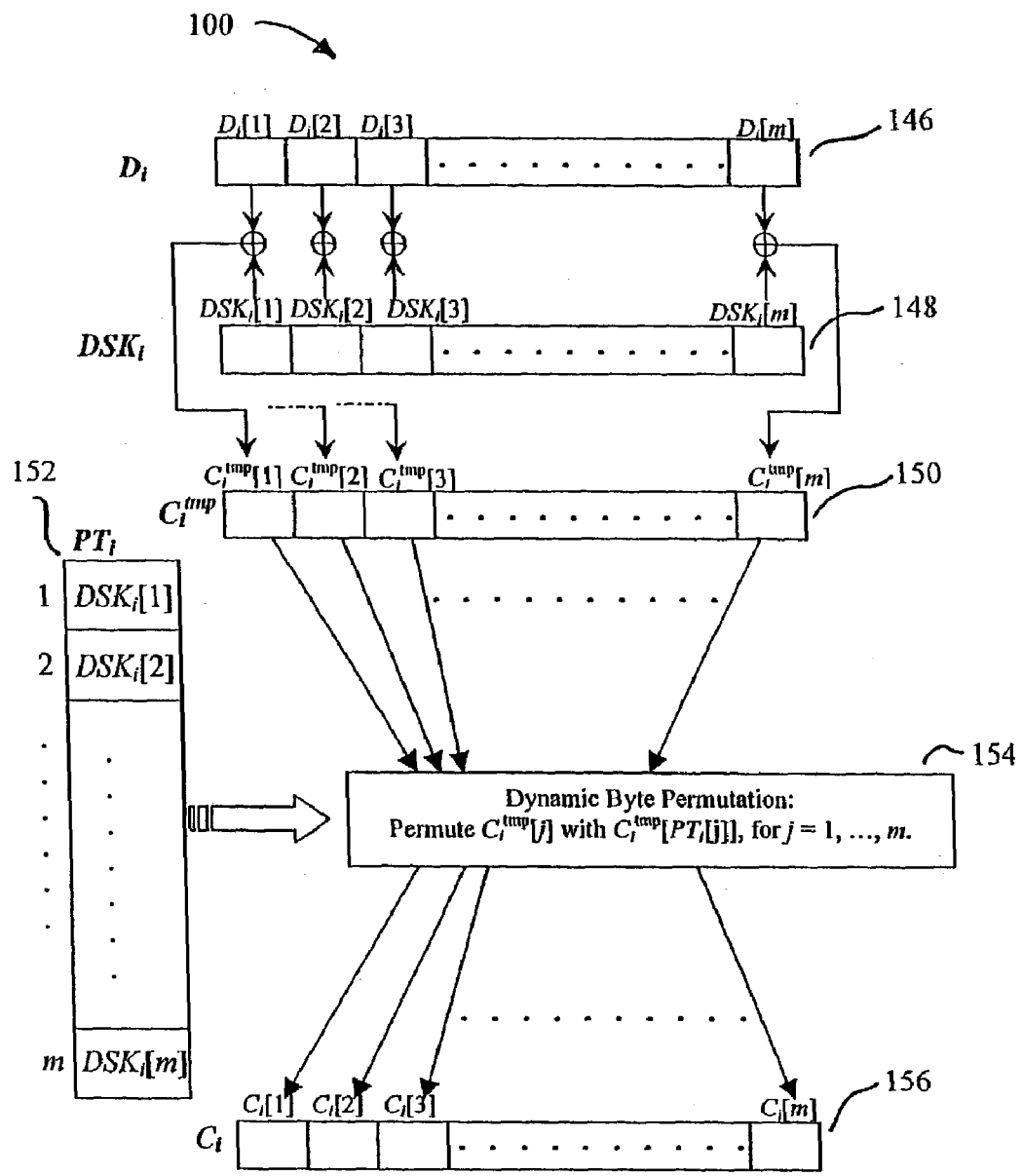
FIG. 11 is a diagrammatic illustration of the dynamic encryption and permutation method of the present invention.

Turning to FIG. 11, a diagram illustrates the encryption method described at 100 of FIG. 8. In FIG. 11: $D_i[j]$ is the $j^{th}$ byte of the $i^{th}$ data record, $DSK_i[j]$ is the $j^{th}$ byte of the corresponding $i^{th}$ DSK, $C_i^{tmp}[j]$ is the $j^{th}$ byte of the $i^{th}$ "temporary cipher record," $C_i[j]$ is the $j^{th}$ byte of the produced $i^{th}$ cipher record, and $PT_i[j]$ is the $j^{th}$ byte of the $i^{th}$ permutation table, $1 \leq i \leq n$ and $1 \leq j \leq m$, for n records, each of which is of m bytes.

Figure 13:
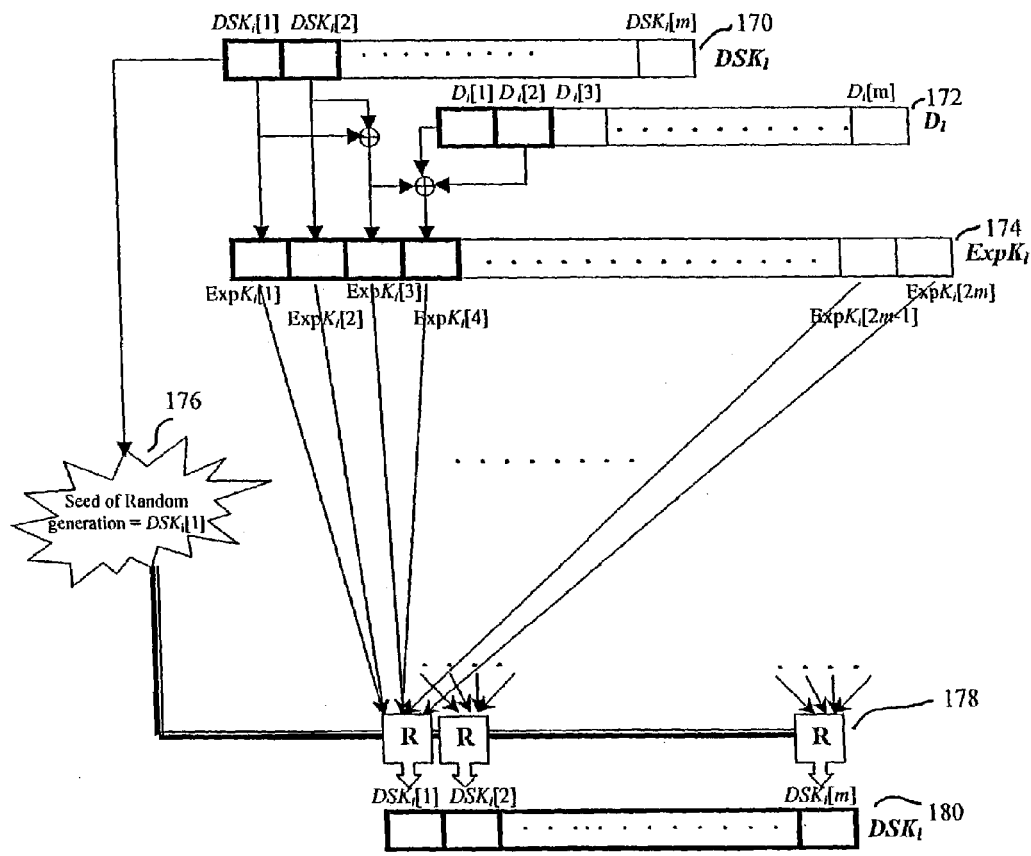
FIG. 13 is a diagrammatic illustration of the DSK regeneration method of the present invention.

The data record $D_i$ and the $DSK_i$ are used to produce $C_i^{tmp}$, which is permuted based on $PT_i$ to produce cipher record $C_i$, $1 \leq i \leq n$, producing n cipher records. The encryption method uses a simple XOR logic operation as an encryption function between a $DSK_i$ and its corresponding data record $D_i$. The data byte $D_i[j]$, 146, is XORed with the corresponding key byte $DSK_i[j]$, 148, resulting in a temporary cipher byte $C_i^{tmp}[j]$, 150. To shuffle the $C_i^{tmp}$ bytes around, a permutation table $PT_i$, 152 is generated as a copy of the corresponding $DSK_i$. The $PT_i$ bytes are scanned from index 1 to index m, using each entry's index and its associated entry value, as indices of two bytes in the temporary cipher record to be swapped. The permutation is performed as follows: permute $C_i^{tmp}[j]$ with $C_i^{tmp}[PT_i[j]]$, for $1 \leq j \leq m$, which results in the final cipher record $C_i$, 156. After n data records are encrypted with n DSKs as aforementioned, the final cipher block, made up of n cipher records ($C_i$, where $1 \leq i \leq n$), is available for transmission, and a set of n new DSKs is regenerated for encryption of the next data block, as shown in FIG. 13.

Returning to FIG. 8, the final cipher block is transmitted to $U_d$, 104 after having generated the n updated DSKs, 102, for encrypting the next data block of n records. The method of data encryption and transmission is repeated, 106, until the entire data volume has been encrypted and transmitted.

Figure 9:
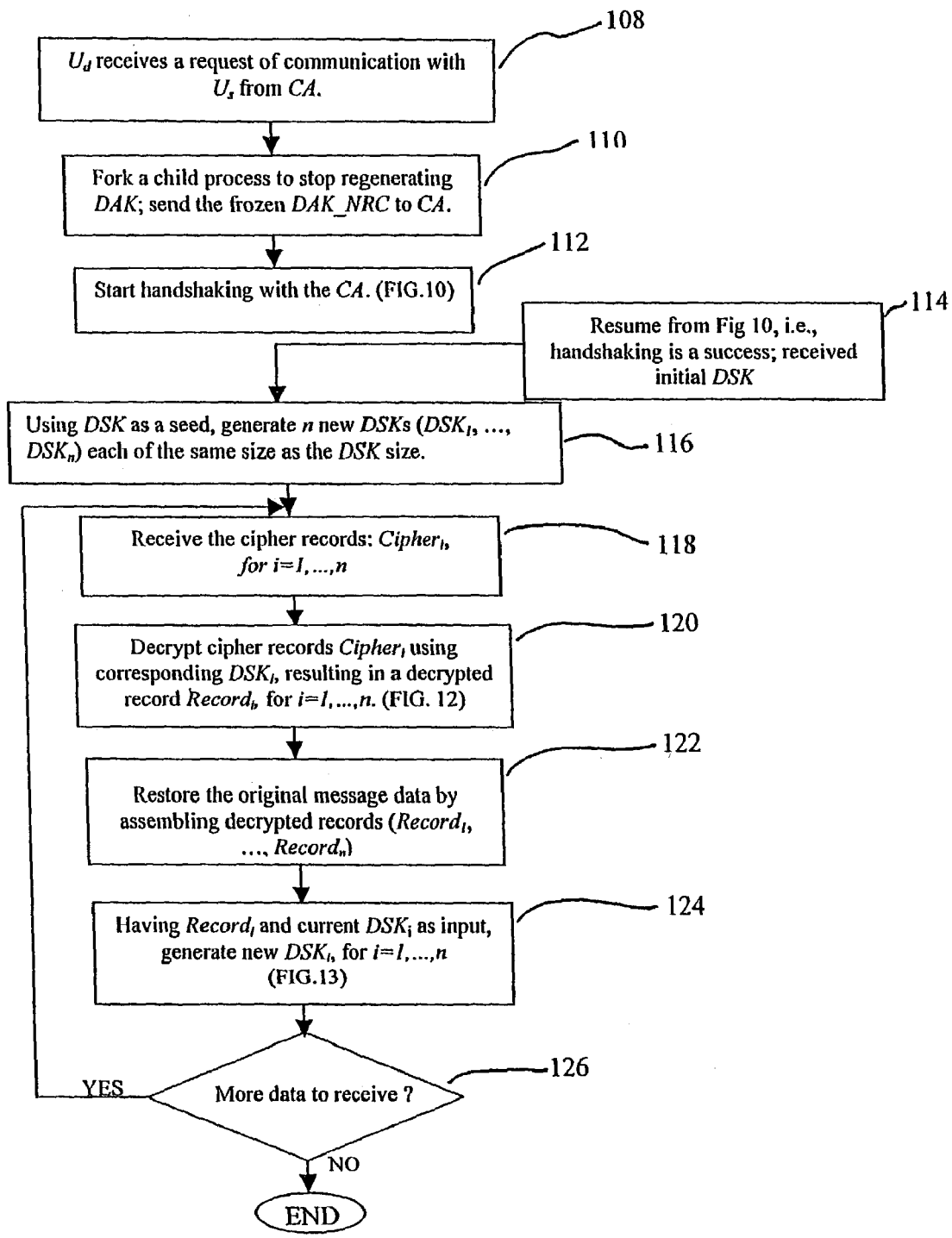
FIG. 9 is a diagrammatic illustration of secure communication establishment at the destination user node in accordance with the present invention.

The decryption method is depicted in FIG. 9 at the destination side, $U_d$. Initially, $U_d$ receives a communication request from the CA, 108. Then its DAK daemon forks a child communication process $U_{d\_COM}$ in order to freeze the generation of its version of DAK and sends the DAK_NRC to the CA for synchronization purposes, 110. $U_{d\_COM}$ will run on behalf of the user until the end of the users' session communication. In the event of successful handshaking with the CA, 112 (FIG. 10), the destination user receives an initial dynamic session key DSK, from the CA, 114.

After successful handshaking, $U_d$ uses the initial DSK to randomly generate n DSKs ($DSK_i$; $1 \leq i \leq n$) of the same size as the initial DSK (used as a seed), 116. Beginning with the same initial DSK at both $U_s$ and $U_d$ sites, $U_d$ randomly derives the same set of n regenerated DSKs as the source user $U_s$, and parallels the encryption method described at the source user side in reverse, to decrypt the transmitted data.

$U_d$ receives a block of n cipher records ($Cipher_i$; $1 \leq i \leq n$) 118. All cipher records are decrypted using each record's corresponding DSK, 120. Concatenation of the decrypted records provides the original message data to the destination user, 122. $U_d$ generates n new DSKs from the recovered block of data records and the current DSKs to be used for decryption of the next block of cipher records, 124, as illustrated in FIG. 13. The process is repeated, 126, until all the transmitted cipher data has been decrypted.

Figure 12:
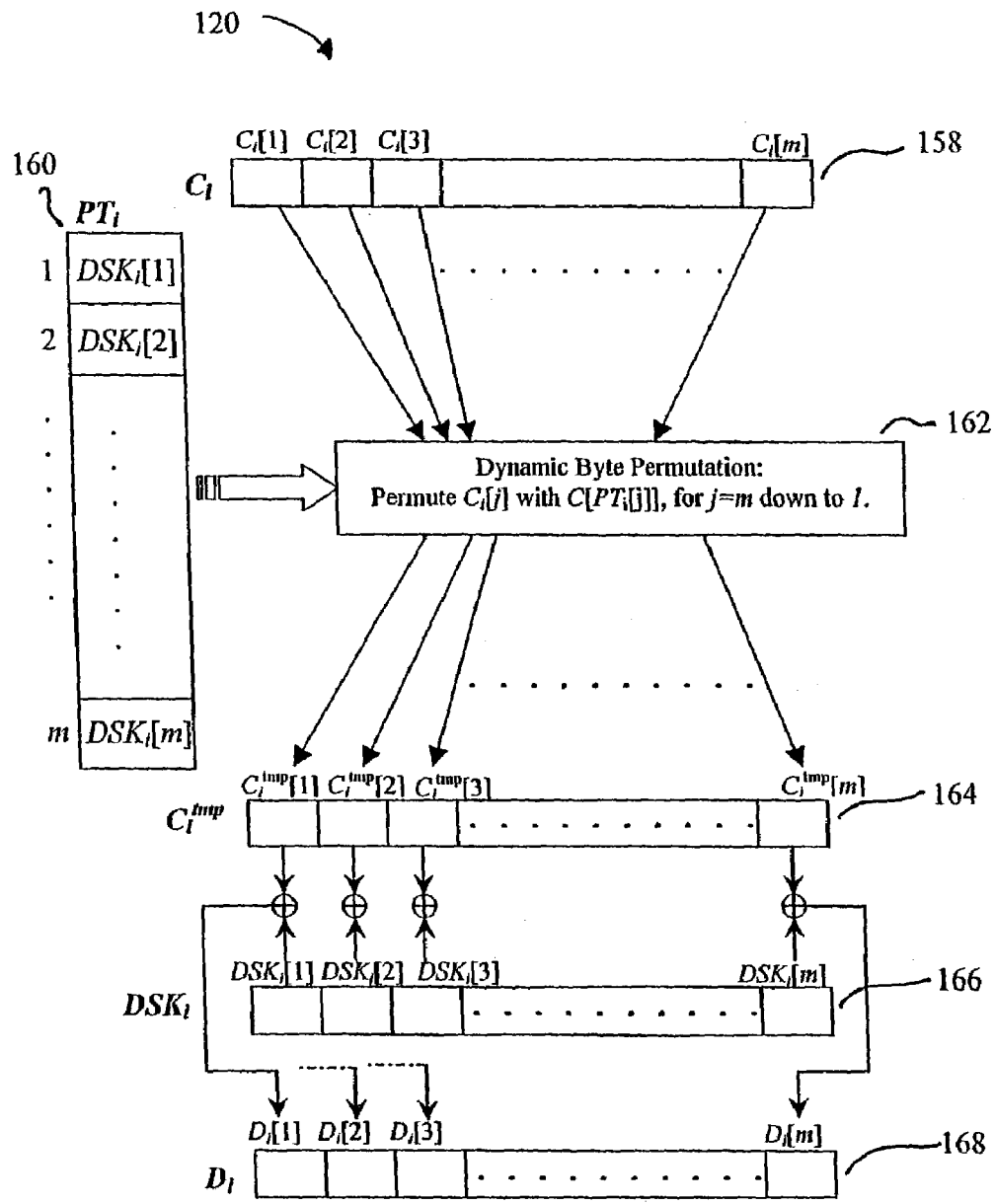
FIG. 12 is a diagrammatic illustration of the dynamic decryption and permutation method of the present invention.

Referring to FIG. 12, a diagram illustrates the decryption method at 120 of FIG. 9 in greater detail. To shuffle the m bytes of each of the received n cipher records, 158, back to the correct order, a permutation table $PT_i$ is generated for each cipher record $C_i$, 160. The permutation table is generated, as at the source side, as a copy of the corresponding DSK. Permutation is performed on the received cipher record bytes using each of the table entry's index and its associated entry value, as indices of the two bytes in the cipher record to be swapped, but in bottom-up order, 162: permute $C_i[j]$ with $C_i[PT_i[j]]$, for j from m down to 1. The result is a temporary cipher record $C_i^{tmp}$, 164. The decryption method continues by performing the XOR operation on $C_i^{tmp}[j]$, 164 and the corresponding $DSK_i[j]$, for $1 \leq j \leq m$, 166. This results in the original data record $D_i$, for $1 \leq i \leq n$, 168. The process continues as shown in FIG. 9, at 122.

Figure 10:
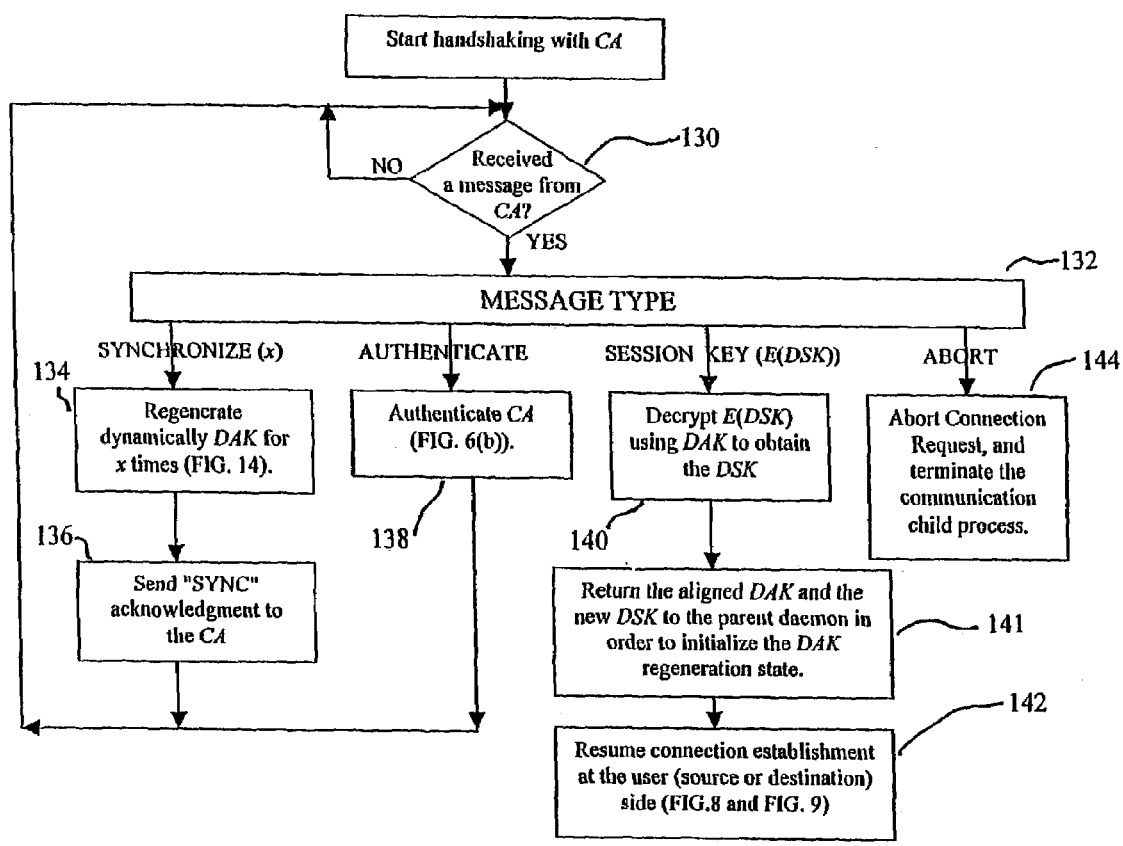
FIG. 10 is a diagrammatic illustration of a user handshaking method with a CA in accordance with the present invention.

As discussed in FIGS. 8 and 9, upon request for a secure communication, both the source user and destination user must accomplish a successful handshaking process with the CA. FIG. 10 illustrates a user handshaking method with the CA. Upon receiving a message from the CA, 130, the user responds accordingly, 132. If an "abort" message is received, then the user terminates the communication child process in charge of the connection, 144. If authentication is requested, 138, the user mutually authenticates with the CA as described in FIG. 6(b). If a "synchronize" message is received including a number (x), the user performs x regenerations of its DAK, in order to be synchronized with the CA, i.e., aligning to the same DAK 134, as described in FIG. 5. An acknowledgment message is then sent back to the CA, 136.

After either synchronization or authentication, the user waits for a "session key" message including an encrypted DSK, (E(DSK)). The encrypted DSK is decrypted, 140. Then, the communication child process returns the aligned DAK and the new DSK to its parent daemon in order to initialize a new state for the DAK regeneration state, 141, and the communication between the source and destination is securely established, 142. The process continues at 96 of FIG. 8 and 116 of FIG. 9.

Turning to FIG. 13, a diagram illustrates the dynamic session key (DSK) regeneration method of FIG. 8, 102, and FIG. 9, 124, where $DSK_i[j]$ represents the $j^{th}$ byte of the last $i^{th}$ dynamic session key, $D_i[j]$ represents the $j^{th}$ byte of the last $i^{th}$ data record, and $ExpK_i[h]$ represents the $h^{th}$ byte of the $i^{th}$ "expanded key", $1 \leq i \leq n$ and $1 \leq j \leq m$, $1 \leq h \leq 2m$. Each unit R represents the random selection of one byte among the $ExpK_i$'s 2m bytes. Each newly generated $DSK_i$ is created using the last exchanged data record $D_i$, 172 and the last $DSK_i$, 170. First, an expanded key ($ExpK_i$), 174, of twice the size of $DSK_i$ is generated. Each of $DSK_i$, $D_i$, and $ExpK_i$ is divided into (m/2) regions, indexed from 1 to (m/2). Each region of $DSK_i$ and $D_i$ is of length 2 bytes, and each region of $ExpK_i$ is 4 bytes. The indexes of the four consecutive bytes of any region r, in the $ExpK_i$, are indexed with the values: 4r-3, 4r-2, 4r-1, and 4r. The indexes of the two consecutive bytes of any region r, in the $DSK_i$ and $D_i$, are indexed with the values: 2r-1 and 2r. Filling the four bytes of region r in the $ExpK_i$, from $DSK_i$ and $D_i$ is defined as follows:

$ExpK_i[4r-3] \leftarrow DSK_i[2r-1]$
$ExpK_i[4r-2] \leftarrow DSK_i[2r]$
$ExpK_i[4r-1] \leftarrow (DSK_i[2r-1])$ XOR $(DSK_i[2r])$
$ExpK_i[4r] \leftarrow (DSK_i[2r-1])$ XOR $(DSK_i[2r])$ XOR $(D_i[2r-1])$ XOR $(D$ Then, a random selection of m bytes from the 2m bytes of $ExpK_i$ is performed, 178, based on the $DSK_i[1]$ byte as the random function seed, 176. Alternatively, any randomly selected byte can serve as the random function seed. This function generates a sequence of m random numbers, in the range between 1 and 2m, each of which represents the index of the byte to be placed as the next byte of the newly generated $DSK_j$, 180. This operation is performed at both the source and destination user nodes. The method can be performed periodically or a periodically (with mutual consent of source and destination), depending on the implementation of the invention.

It will be understood by those of skill in the art that the ExpK of FIGS. 13 and 14, can alternatively be comprised of any number of bytes, and the invention is not limited to any particular size for ExpK. It will also be understood that the byte positions chosen to be XORed together to fill the positions of the ExpK of FIGS. 13 and 14 could similarly be altered, and still remain within the inventive scope of the dynamic encryption and authentication method. It will also be understood that the size of the regions of the keys used to regenerate new DSKs and DAKs, need not be 2 or 4 bytes, but could be of any size within the size of the respective keys. Similarly, alternative logic operations could be substituted for the XOR operation.

Wireless Communication Network Security

Figure 16A:
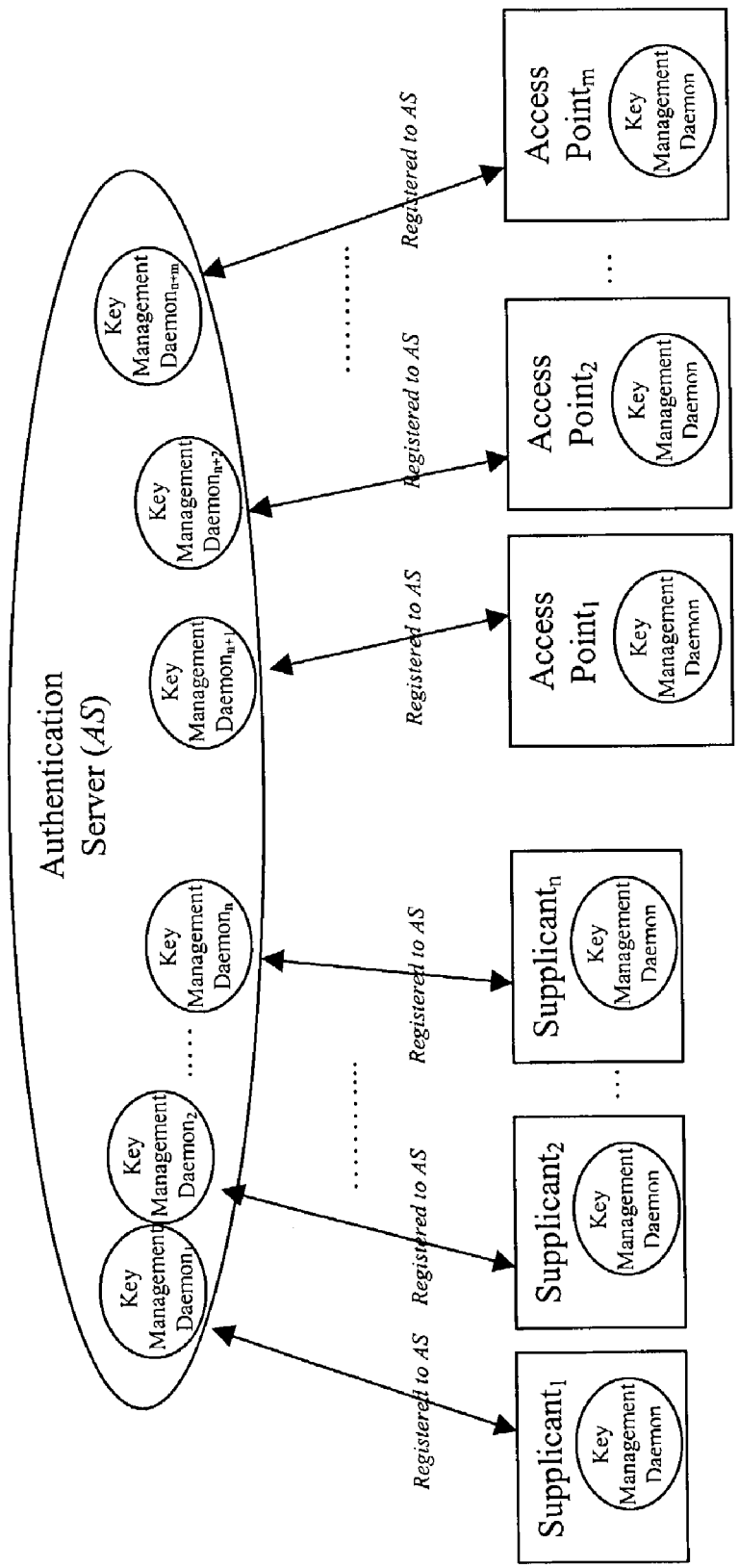
FIG. 16a is a diagrammatic overview of the second embodiment of the present invention for dynamic security authentication for a wireless communication network where an authentication server (AS) generates daemons to manage dynamic authentication keys (DAKs) for supplicants and access points.
Figure 16B:
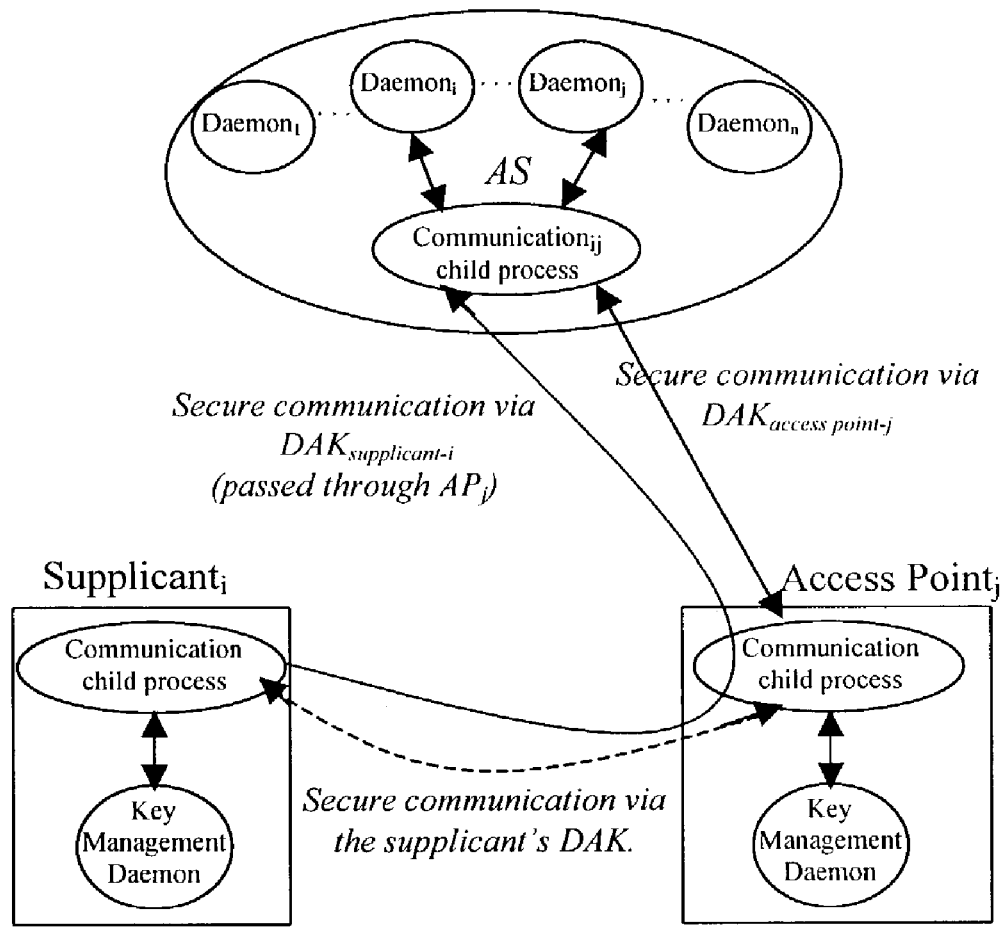
FIG. 16b is a diagrammatic overview of the second embodiment of the present invention for dynamic security authentication for a wireless communication network showing communication between a supplicant, access point, and authentication server mutually authenticated by secure dynamic authentication keys (DAKs)

In a second embodiment, the present invention utilizes the continuous DAK regeneration mechanism of the first embodiment as depicted in FIGS. 14, 15a and 15b to implement secure and dynamic authentication between wireless communication network nodes. Referring to FIG. 16a, a diagrammatic overview of the second embodiment of the present invention for dynamic authentication for wireless communication network security managed by an authentication server (AS) is shown. The AS generates daemons to manage dynamic authentication keys (DAKs) for all supplicants and access points (APs). FIG. 16b shows a diagrammatic overview of communication between a supplicant, access point, and authentication server mutually authenticated by secure dynamic authentication keys (DAKs) 300.

As used with reference to the second embodiment of the invention, the term "node" refers to a communications terminal, such as an authentication server, supplicant, or access point. The term "authentication server" (AS) refers to a central communication node residing at a programmable apparatus such as a computer or network server that is in communication with supplicants via access points. Computer-readable memory in communication with the AS programmable apparatus provides storage for data, dynamically changing keys, and other variables as needed to allow for the regeneration of subsequent dynamic keys, and to carry out other necessary processes within the computer. Suitable means are provided on the AS programmable apparatus for performing all of the various methods involved in the dynamic authentication method. Such means include primarily computer-readable means, such as software, and the necessary related hardware.

As used herein, the term "supplicant" refers to a mobile communication device having wireless communication capability. A non-exhaustive list of supplicants includes such devices as laptops, personal digital assistants (PDAs), cellular or satellite telephones, and the like. Such devices include suitable memory, means for performing all of the various steps involved in the dynamic authentication method such as software routines implemented upon programmable devices, and processing capability. An "access point" (AP) refers to a mobile communications base station or other intermediary through which communications between supplicants and the AS are channeled. Access points conventionally comprise a programmable apparatus such as a computer or network server. Computer-readable memory in communication with the AP programmable apparatus provides storage for data, dynamically changing keys, and other variables as needed to allow for the regeneration of subsequent dynamic keys, and to carry out other necessary processes within the computer. Suitable means are provided on the AP programmable apparatus for performing all of the various methods involved in the dynamic authentication method. Such means include primarily computer-readable means, such as software, and the necessary related hardware.

The nodes communicate with one another over one or more communication channels. Communications between an AS and APs conventionally occur over landline connections. Communication with a supplicant conventionally occurs over wireless connections, such as via radio frequency (rf) telecommunications channels. However, the invention is not limited to implementation over landline or wireless communication channels.

The AS maintains a separate DAK for each AP connected in the network for secure communication between them. Typically there are groups of a finite number of APs forming clusters in a wireless communication network. For example, there are usually six base stations in a cluster in a cellular telecommunications architecture. Therefore, in order to minimize the overhead when a handover event occurs, the AP and each of its immediate neighbors mutually authenticate via the AS, which results in separate initial dynamic session keys for each pair of APs. This dynamic session key is used to secure the communication, for example, handover frames, between every two neighboring APs.

The authentication process for supplicants and APs begins with the assignment and installation of a secure node identifier, preferably a manufactured wireless protocol card, at each participating supplicant and AP. Each card preferably contains identification information consisting of, for example, a medium access control (MAC) address, and an initial value of a dynamic authentication key (IDAK). The identification information for each card is also stored securely at the AS, which is responsible for securing supplicant and AP authentication.

Next, the AS and AP, or AS and supplicant establish the same offline dynamic change yielding the same new randomly regenerated DAK at each node, referred to herein in the second embodiment as "synchronously" regenerating DAKs. This occurs when node identifier information, such as an authentication key, node address, encrypted node address, nonce, encrypted nonce, or any combination thereof are sent from one node to another enabling them to mutually authenticate or establish a secure connection. Upon the initiation of any authentication process, both nodes freeze their key generation and synchronize to obtain the same frozen DAK. The DAK is involved in the authentication process as the encryption/decryption key, since it is maintained only by the AS, supplicant, and AP.

The regeneration method for DAK is depicted in FIGS. 14, 15a and 15b as discussed in detail with reference to the first embodiment. As in the first embodiment, the auxiliary static key (K) 184 of FIG. 14 is formed either from two copies of a DAK (FIG. 15a) or from a DAK and an encryption key (FIG. 15b), where the encryption key can be a dynamic session key (DSK) as in the first embodiment, or other encryption key.

Figure 17:
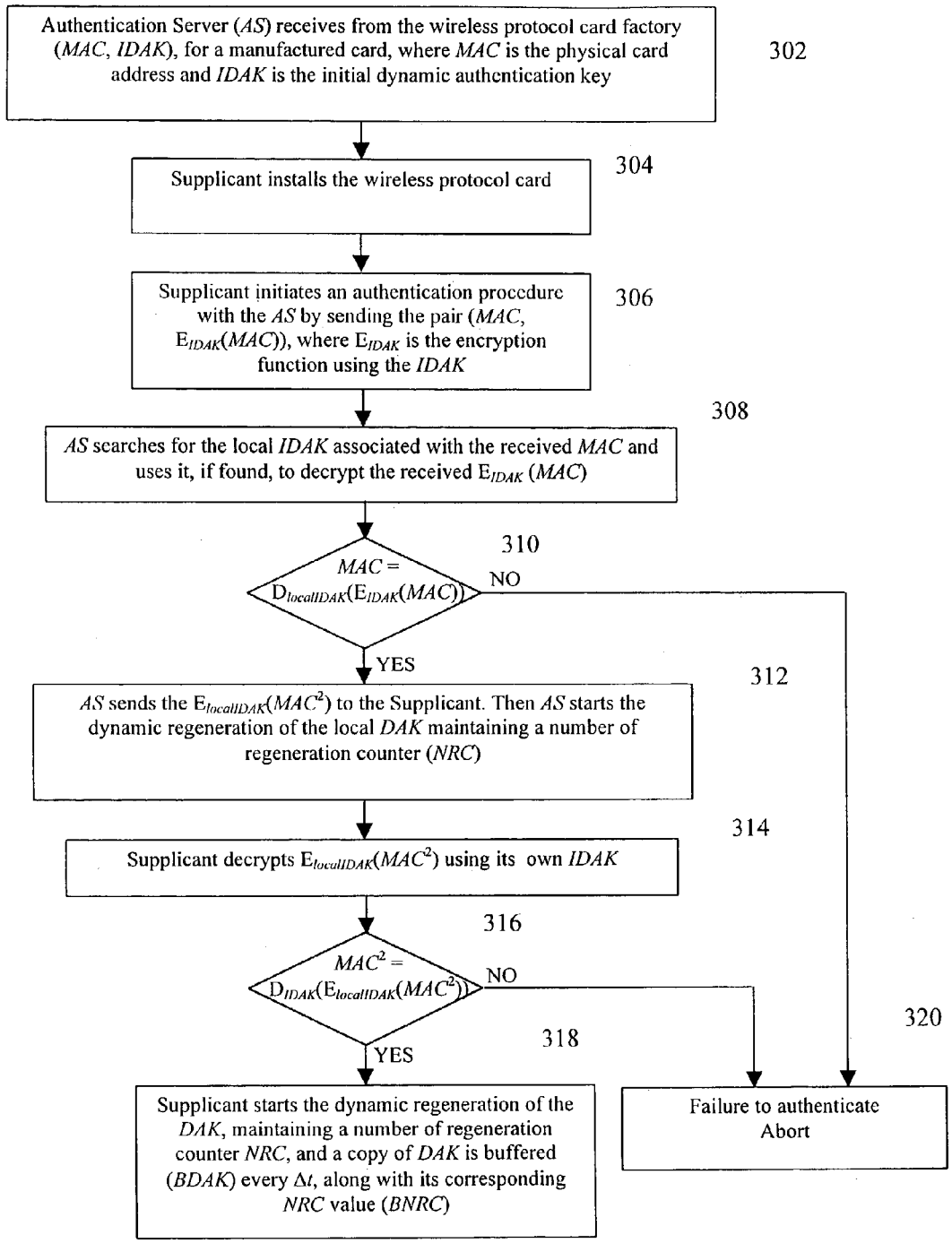
FIG. 17 schematically illustrates mutual initial authentication of the supplicant or access point and the authentication server.

Referring to FIG. 17, a diagram schematically illustrates mutual initial authentication of the supplicant and the AS. The identical process is followed by the AP for initial mutual authentication with the AS and is not repeated here. As stated, the AS receives identification information for a manufactured wireless protocol card (MAC, IDAK), where MAC is the physical card address and IDAK is the initial dynamic authentication key, from a wireless protocol card manufacturing facility, 302. When a supplicant installs the wireless protocol card 304, an authentication procedure is initiated with the AS. The supplicant sends the MAC address along with an encrypted MAC address as a pair, (MAC, $E_{IDAK}$(MAC)) to the AS where $E_{IDAK}$ is the encryption function using the IDAK, 306. To send the pair (MAC, $E_{IDAK}$(MAC)) to the AS, the supplicant may initially contact a local AP, however, until the AP is advised of the authentication of the supplicant, the AP forwards the transmission to the AS.

Upon receiving (MAC, $E_{IDAK}$(MAC)), the AS searches for the local IDAK associated with the received MAC. If the AS locates the local IDAK associated with the received MAC, it is used to decrypt the received $E_{IDAK}$ (MAC), 308. The decrypted $E_{IDAK}$ (MAC) is then compared to the received MAC value, 310. If the decrypted $E_{IDAK}$ (MAC) is equal to the received MAC value, AS authenticates the supplicant successfully and starts the dynamic regeneration procedure for the corresponding supplicant DAK, maintaining a number of regeneration counter (NRC), 312. AS also sends back a function of the MAC, preferably $MAC^2$ (MAC*MAC) encrypted with the local IDAK to the supplicant, $E_{IDAK}$ ($MAC^2$), 312.

The supplicant decrypts the received $E_{IDAK}$ ($MAC^2$) with its local IDAK 314 and compares the result to its $MAC^2$, 316. Upon a finding of equality, the supplicant authenticates the AS successfully, and starts the dynamic regeneration procedure for its DAK, 318. The dynamic regeneration procedure includes the maintenance of a number of regeneration counter (NRC). A DAK and an NRC are buffered every Δt, (BDAK, BNRC), at the supplicant node to facilitate the handover mechanism described below with reference to FIG. 19. In the event of a failure of authentication due to an inequality at either of the comparison steps, the authentication is aborted 320 and every party retains its original value of IDAK.

Figure 18:
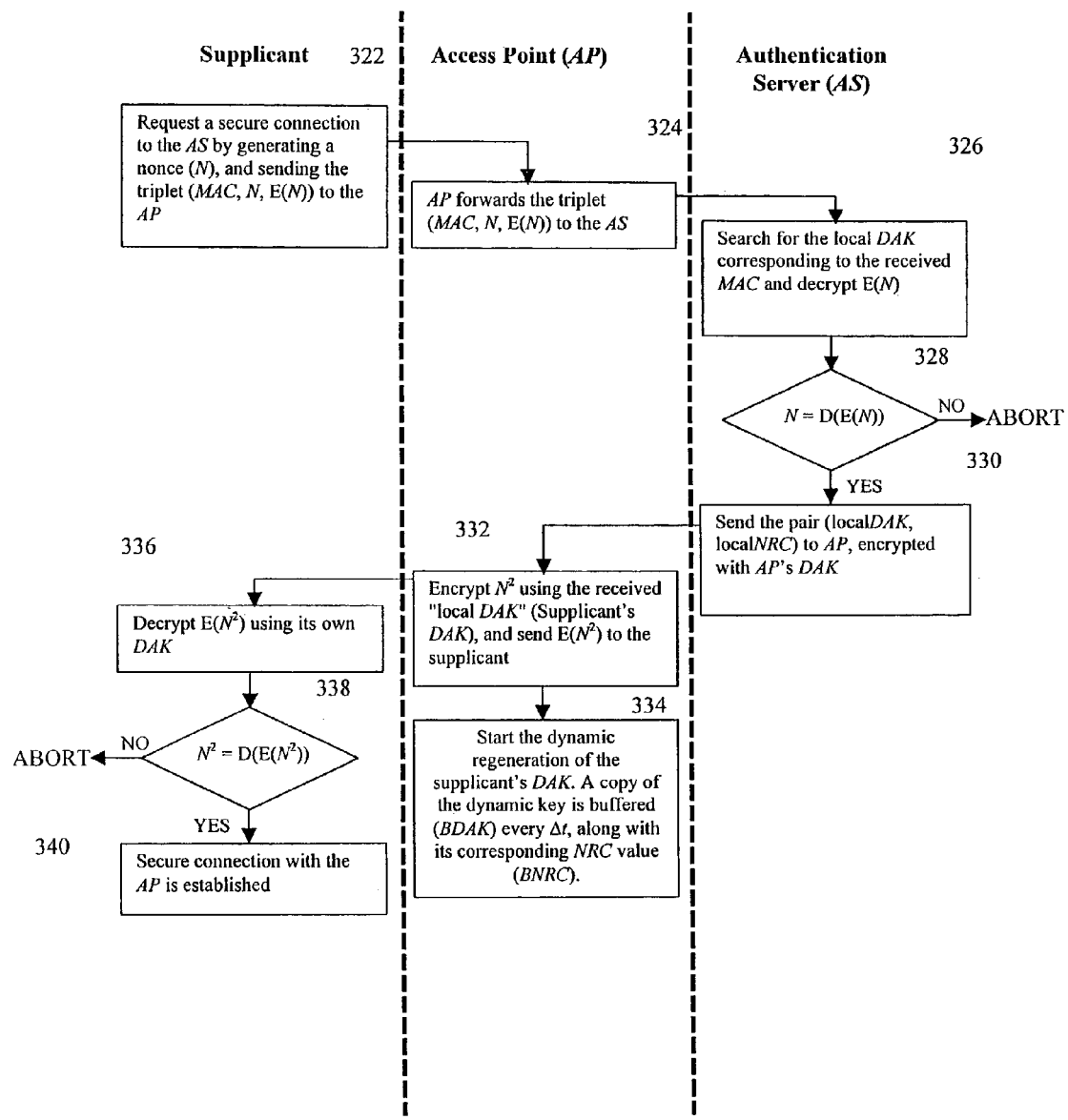
FIG. 18 schematically illustrates an initial connection between a supplicant and an access point.

Once the supplicant and AP are each mutually authenticated to the AS, the supplicant can request a secure connection for communications. Turning to FIG. 18, a diagram schematically illustrates an initial connection between a supplicant and AP. First, the supplicant requests a secure connection by generating a nonce (N) and sending the triplet (MAC, N, E(N)) to the AP, where E(N) is the encryption of N using the supplicant's DAK, 322. Then the AP forwards the triplet (MAC, N, E(N)) to the AS, 324. AS performs a search based upon the received MAC in order to locate the associated DAK, 326. The local DAK of the AS is then used to decrypt E(N), 326. If the decryption of E(N) using DAK equals N, then the AS successfully authenticates the supplicant, 328.

At this point, the authentication procedure of the supplicant migrates from the AS to the AP. The AS securely sends the supplicant's DAK and NRC to the AP encrypted with the AP's DAK, 330. Thereafter, the AP begins authenticating itself to the supplicant by sending an encrypted version of a function of the nonce, for example, $E(N^2)$, using the local, supplicant's DAK, 332. The AP also begins regenerating dynamically the supplicant's DAK, buffering a copy of the DAK every Δt along with its corresponding NRC value, (BDAK, BNRC), 334. The supplicant then decrypts the received $E(N^2)$ using its DAK, 336. If the supplicant finds equality between $N^2$ and the decryption of the received $E(N^2)$, 338, the supplicant authenticates the AP successfully, and a secure connection is started with the AP, 340.

Figure 19:
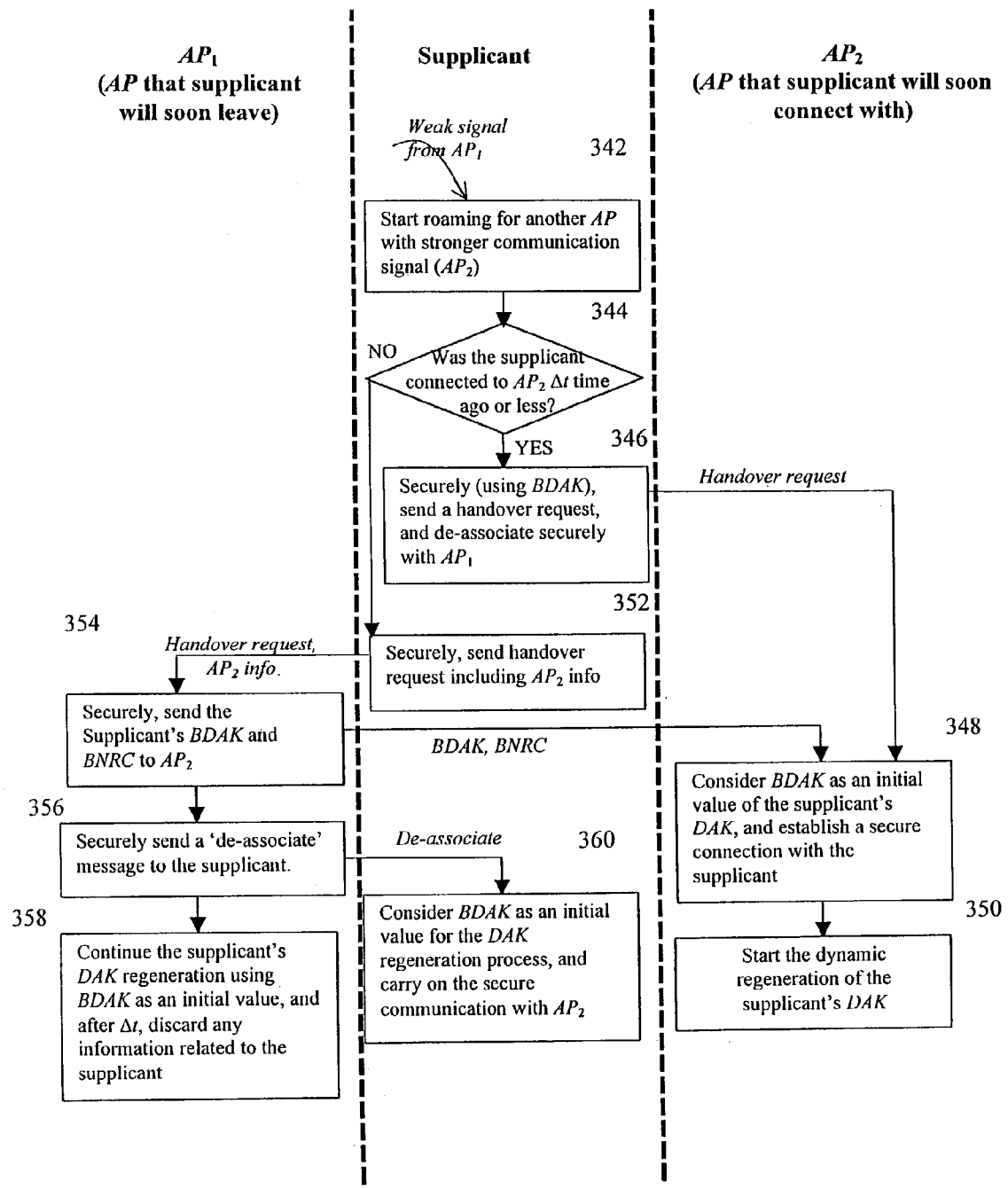
FIG. 19 schematically illustrates seamless handover of a supplicant from a first access point to a second access point.

Due to the mobility of the supplicant, communication through a first AP must often be handed off to a second AP when the communication signal through the first AP becomes weakened or disrupted. Referring to FIG. 19, a diagram schematically illustrates the seamless handover of a supplicant from a first AP, ($AP_1$) to a second AP, ($AP_2$) in this event. When the supplicant locates $AP_2$ for a handoff, 342, the supplicant first determines whether it was recently associated with $AP_2$. This is accomplished by determining whether the supplicant was previously in communication with $AP_2$ during a time period of t≦Δt in the past, 344.

If the supplicant has recently been associated with $AP_2$, during a time period of t≦Δt ago, then the supplicant sends a secure handover request to $AP_2$, using its buffered DAK (BDAK), 346. The supplicant then re-associates with $AP_2$ automatically, where $AP_2$ considers the BDAK to be the initial value of the supplicant's DAK, establishes a secure connection, 348, and begins the dynamic regeneration of the DAK, 350. The supplicant also notifies $AP_1$ that it is de-associating with $AP_1$ by sending a secure de-association message, 346. This process minimizes the regular handover overhead when the supplicant requests a re-association within Δt of a de-association with the same AP.

If the supplicant has not been recently associated with $AP_2$ during a time period of t≦Δt ago, then the supplicant sends a handover request to $AP_1$, which includes information pertaining to $AP_2$, 352. Such information may include the IP address for $AP_2$ or any appropriate identifying information. In conventional telecommunications networks, $AP_1$ and $AP_2$ are adjacent and wired together via landline connections; therefore, they are pre-authenticated to one another via the AS, once in their life cycle. Following the rule of "a trusted by a trusted is trusted", $AP_1$ sends a secure handover request to $AP_2$ including the supplicant's BDAK and BNRC, 354. Then, $AP_1$ sends a secure "de-associate" message to the supplicant, 356. $AP_1$ thereafter continues DAK regeneration using the BDAK as the initial value, and waits for a time of Δt before erasing any information related to the supplicant, 358. $AP_2$ considers the received BDAK as the initial value of the DAK, 348, and begins the regeneration of the DAK, 350. Similarly, the supplicant considers the BDAK as the initial value of the DAK and begins the regeneration of the DAK, 360 effecting a seamless and secure synchronization between the supplicant and AP. Secure communications between a supplicant and AP are accomplished via the supplicant's DAK, which was initialized by the BDAK exchanged at the handover process.

Although the invention has been described in detail with reference to these preferred embodiments, other embodiments can achieve the same results. Variations and modifications of the present invention will be obvious to those skilled in the art and it is intended to cover in the appended claims all such modifications and equivalents.

What is claimed is:

1. A method of providing secure authentication between wireless communication network nodes, the method comprising:
   providing a node identifier comprising an address and an initial authentication key;
   installing the node identifier at a first network node;
   storing the node identifier at a second network node;
   sending node identifier information from a first network node to a second network node; and
   synchronously regenerating an authentication key at two network nodes based upon node identifier information.

2. The method of claim 1 wherein the step of sending node identifier information from a first network node to a second network node comprises comparing the sent node identifier information to the stored node identifier at a second network node.

3. The method of claim 2 wherein the step of comparing the sent node identifier information to the stored node identifier comprises comparing the sent node identifier address to the stored node identifier and determining an associated authentication key.

4. The method of claim 1 wherein the step of sending node identifier information from a first network node to a second network node comprises:
   encrypting the node identifier address with the initial authentication key; and
   sending the node identifier address and encrypted node identifier address to a second network node.

5. The method of claim 4 wherein the step of sending node identifier information from a first network node to a second network node further comprises comparing the sent node identifier address to the stored node identifier at a second network node and determining an associated authentication key.

6. The method of claim 5 wherein the step of sending node identifier information from a first network node to a second network node further comprises decrypting a node identifier address with the associated authentication key at a second network node.

7. The method of claim 6 wherein the step of sending node identifier information from a first network node to a second network node further comprises comparing the decrypted node identifier address to the sent node identifier address.

8. The method of claim 7 wherein the step of sending node identifier information from a first network node to a second network node further comprises:
   encrypting a function of the node identifier address with the associated initial authentication key at a second network node; and
   sending the encrypted function to a first network node.

9. The method of claim 8 wherein the step of sending node identifier information from a first network node to a second network node further comprises:
   decrypting the encrypted function with an initial authentication key at a first network node; and
   comparing the decrypted function to the function.

10. The method of claim 1 wherein the step of synchronously regenerating an authentication key at two network nodes based upon node identifier information comprises synchronously regenerating an authentication key at two network nodes based upon an initial authentication key.

11. The method of claim 1 wherein the step of synchronously regenerating an authentication key at two network nodes based upon node identifier information comprises maintaining a number regeneration counter.

12. The method of claim 1 wherein the step of synchronously regenerating an authentication key at two network nodes based upon node identifier information comprises buffering an authentication key.

13. The method of claim 1 wherein the step of synchronously regenerating an authentication key at two network nodes based upon node identifier information comprises:
   maintaining a number regeneration counter; and
   buffering an authentication key and number regeneration count every $\Delta t$.

14. The method of claim 1 wherein the step of sending node identifier information from a first network node to a second network node comprises:
   generating a nonce;
   encrypting the nonce with the authentication key; and
   sending the node identifier address, nonce and encrypted nonce from a first network node to a second network node.

15. The method of claim 14 further comprising the step of forwarding the node identifier address, nonce and encrypted nonce from a second network node to a third network node.

16. The method of claim 15 wherein the step of forwarding the node identifier address, nonce and encrypted nonce from a second network node to a third network node further comprises comparing the sent node identifier address to a stored node identifier at a third network node and determining an associated authentication key.

17. The method of claim 16 wherein the step of forwarding the node identifier address, nonce and encrypted nonce from a second network node to a third network node further comprises decrypting the encrypted nonce with the associated authentication key at a third network node.

18. The method of claim 17 wherein the step of forwarding the node identifier address, nonce and encrypted nonce from a second network node to a third network node further comprises comparing the decrypted nonce to the sent nonce.

19. The method of claim 18 further comprising the steps of:
   encrypting an authentication key and a number regeneration count with an authentication key of a second node; and
   sending the encrypted authentication key and number regeneration count from a third to a second network node.

20. The method of claim 19 further comprising the steps of:
   encrypting a function of a nonce with an authentication key of a first network node; and
   sending the encrypted function from a second network node to a first network node.

21. The method of claim 20 further comprising the steps of:
   decrypting the encrypted function with an authentication key at a first network node; and
   comparing the decrypted function to the function.

22. The method of claim 13 further comprising the steps of:
   sending a handover request with a buffered authentication key from a first network node to a second network node;
   deassociating the first network node with the second network node;
   connecting a first network node to a third network node; and
   regenerating an authentication key at the third network node based upon the buffered authentication key.

23. The method of claim 13 further comprising the steps of:
- establishing a connection between a first network node and a second network node;
- roaming for a third network node;
- determining whether the first network node was connected to the third network node within a previous time period $\Delta t$;
- sending a handover request with a buffered authentication key including third network node information from the first network node to the second network node;
- sending a buffered authentication key and number regeneration count of the first network node to the third network node;
- connecting a first network node to a third network node; and
- regenerating an authentication key at the first and third network nodes based upon the buffered authentication key.

24. The method of claim 1 further comprising the step of maintaining a number regeneration counter associated with regeneration of authentication keys.

25. The method of claim 24 further comprising the step of buffering an authentication key and associated number regeneration count.

26. A network for providing secure authentication between wireless communication network nodes, the network comprising:
- a first network node;
- a node identifier comprising an address and an initial authentication key, said node identifier associated with said first network node;
- a second network node, said second network node comprising means for storing said node identifier;
- a communication channel between said first and second network nodes; and
- means for synchronously regenerating an authentication key at said first and second network nodes based upon said node identifier.

* * * * *